United States Patent
Eilert et al.

(10) Patent No.: US 11,829,729 B2
(45) Date of Patent: Nov. 28, 2023

(54) SPATIOTEMPORAL FUSED-MULTIPLY-ADD, AND RELATED SYSTEMS, METHODS AND DEVICES

(71) Applicant: Micron Technology, Inc., Boise, ID (US)

(72) Inventors: Sean S. Eilert, Penryn, CA (US); Shivasankar Gunasekaran, Folsom, CA (US); Ameen D. Akel, Rancho Cordova, CA (US); Dmitri Yudanov, Cordova, CA (US); Sivagnanam Parthasarathy, Carlsbad, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/888,345

(22) Filed: May 29, 2020

(65) Prior Publication Data

US 2021/0072957 A1    Mar. 11, 2021

Related U.S. Application Data

(60) Provisional application No. 62/896,242, filed on Sep. 5, 2019.

(51) Int. Cl.
   *G06F 7/544*    (2006.01)
   *G06F 17/16*    (2006.01)

(52) U.S. Cl.
   CPC ............ *G06F 7/5443* (2013.01); *G06F 17/16* (2013.01)

(58) Field of Classification Search
   CPC .... G06F 7/5443; G06F 17/16; G06F 2207/48; G11C 11/00–5692; G06G 7/16
   See application file for complete search history.

(56) References Cited

U.S. PATENT DOCUMENTS 6,484,231 B1    11/2002   Kim
9,430,735 B1 *   8/2016   Vali ................. G11C 7/106
(Continued)

FOREIGN PATENT DOCUMENTS

KR    10-2014-0033937 A     3/2014
KR    10-2017-0138143 A    12/2017
(Continued)

OTHER PUBLICATIONS

P. Chiu, W. H. Choi, W. Ma, M. Qin and M. Lueker-Boden, "A Binarized Neural Network Accelerator with Differential Crosspoint Memristor Array for Energy-Efficient MAC Operations," 2019 IEEE International Symposium on Circuits and Systems (ISCAS), 2019, pp. 1-5, doi: 10.1109/ISCAS.2019.8702128. (Year: 2019).*
(Continued)

*Primary Examiner* — Emily E Larocque
*Assistant Examiner* — Carlo Waje
(74) *Attorney, Agent, or Firm* — TraskBritt

(57) ABSTRACT

Systems, apparatuses, and methods of operating memory systems are described. Processing-in-memory capable memory devices are also described, and methods of performing fused-multiply-add operations within the same. Bit positions of bits stored at one or more portions of one or more memory arrays, may be accessed via data lines by activating the same or different access lines. A sensing circuit operatively coupled to a data line may be temporarily formed and measured to determine a state (e.g., a count of the number of bits that are a logic "1") of accessed bit positions of a data line, and state information may be used to determine a computational result.

22 Claims, 12 Drawing Sheets

(56) References Cited

U.S. PATENT DOCUMENTS

| | | | |
|---|---|---|---|
| 9,496,023 | B2 | 11/2016 | Wheeler et al. |
| 9,704,540 | B2 | 7/2017 | Manning et al. |
| 10,074,407 | B2 | 9/2018 | Manning et al. |
| 10,249,350 | B2 | 4/2019 | Manning et al. |
| 10,416,927 | B2 | 9/2019 | Lea et al. |
| 10,453,499 | B2 | 10/2019 | Manning et al. |
| 10,490,257 | B2 | 11/2019 | Wheeler et al. |
| 10,497,442 | B1 | 12/2019 | Kumar et al. |
| 10,635,398 | B2 * | 4/2020 | Lin ................... G11C 13/0069 |
| 10,642,922 | B2 | 5/2020 | Knag et al. |
| 2011/0040821 | A1 | 2/2011 | Eichenberger et al. |
| 2011/0153707 | A1 | 6/2011 | Ginzburg et al. |
| 2012/0182799 | A1 | 7/2012 | Bauer |
| 2013/0173888 | A1 | 7/2013 | Hansen et al. |
| 2015/0006810 | A1 | 1/2015 | Busta et al. |
| 2015/0357024 | A1 | 12/2015 | Hush et al. |
| 2016/0004508 | A1 | 1/2016 | Elmer |
| 2016/0099073 | A1 * | 4/2016 | Cernea ................... G11C 16/32 365/185.19 |
| 2016/0321031 | A1 | 11/2016 | Hancock |
| 2017/0277659 | A1 | 9/2017 | Akerib et al. |
| 2017/0345481 | A1 | 11/2017 | Hush |
| 2018/0129474 | A1 | 5/2018 | Ahmed |
| 2018/0210994 | A1 | 7/2018 | Wuu et al. |
| 2018/0246855 | A1 | 8/2018 | Redfern et al. |
| 2018/0286468 | A1 | 10/2018 | Willcock |
| 2019/0019538 | A1 * | 1/2019 | Li ........................ G11C 7/1006 |
| 2019/0035449 | A1 | 1/2019 | Saida et al. |
| 2019/0042199 | A1 | 2/2019 | Sumbul et al. |
| 2019/0043560 | A1 | 2/2019 | Sumbul et al. |
| 2019/0080230 | A1 * | 3/2019 | Hatcher ................ G06F 7/4806 |
| 2019/0102170 | A1 | 4/2019 | Chen et al. |
| 2019/0102358 | A1 | 4/2019 | Asnaashari et al. |
| 2019/0221243 | A1 | 7/2019 | Manning et al. |
| 2019/0228301 | A1 | 7/2019 | Thorson et al. |
| 2020/0020393 | A1 | 1/2020 | Al-Shamma |
| 2020/0035305 | A1 | 1/2020 | Choi et al. |
| 2020/0082871 | A1 | 3/2020 | Wheeler et al. |
| 2020/0210369 | A1 * | 7/2020 | Song ................... G06F 12/0246 |
| 2020/0342938 | A1 * | 10/2020 | Tran ........................ G11C 11/54 |
| 2020/0357459 | A1 * | 11/2020 | Zidan ................... G06F 7/5443 |
| 2021/0072987 | A1 | 3/2021 | Yudanov et al. |
| 2021/0104551 | A1 * | 4/2021 | Lin ..................... G11C 11/1675 |
| 2021/0110235 | A1 * | 4/2021 | Hoang ..................... G06N 3/04 |

FOREIGN PATENT DOCUMENTS

| | | |
|---|---|---|
| KR | 10-2018-0042111 A | 4/2018 |
| KR | 10-2019-0051766 A | 5/2019 |
| WO | 2018/154268 A1 | 8/2018 |

OTHER PUBLICATIONS

Patterson et al., "Computer Organization and Design: The Hardware/Software Interface", Fifth Edition, Chapter 3.2 pp. 178-182, 2014. Retrieved from <https://ict.litk.ac.in/wp-content/uploads/CS422-Computer-Architecture-ComputerOrganizationAndDesign5thEdition2014.pdf> (Year: 2014).*

International Search Report for Application No. PCT/US2020/070372, dated Nov. 11, 2020, 3 pages.

Written Opinion of the International Searching Authority for Application No. PCT/US2020/070372, 6 pages.

Yudanov et al., U.S. Appl. No. 16/717,890 titled Processing-In-Memory Operations On Serially Allocated Data, and Related Memory Devices and Systems filed Dec. 17, 2019.

European Extended Search Report and Opinion for European Application No. 20861927.0, dated Aug. 25, 2023, 8 pages.

* cited by examiner

SPATIOTEMPORAL FUSED-MULTIPLY-ADD, AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 62/896,242, filed Sep. 5, 2019, the disclosure of which is hereby incorporated herein in its entirety by this reference.

FIELD

Embodiments of the disclosure relate to processing-in-memory and, more specifically, to processing-in-memory dot product operations on memory arrays. Yet more specifically, some embodiments relate to methods for performing dot product operations within a processing-in-memory capable memory device, and related memory devices, memory systems, and electronic systems. Yet more specifically, some embodiments relate to methods of performing fused-multiply-add operations within a process-in-memory capable memory device, and related memory devices, memory systems and electronic systems.

BACKGROUND

Memory devices are typically provided as internal, semiconductor-based, integrated circuits in computers or other electronic systems. There are many different types of memory including volatile and non-volatile memory. Non-volatile memory, which may retrieve stored information after being power cycled, may include, among others, flash memory including NAND or NOR flash memories, 3D XPoint memory and ReRAM, without limitation. Volatile memory may require power to maintain its data (e.g., host data, error data, etc.) and includes random access memory (RAM), dynamic random access memory (DRAM), static random access memory (SRAM), synchronous dynamic random access memory (SDRAM), content addressable memory (CAM), and Thyristor random access memory (TRAM), among others.

Electronic systems often include a number of processing resources (e.g., one or more processors), which may retrieve and execute instructions and store the results of the executed instructions at a suitable location. A processor may include a number of functional units such as arithmetic logic unit (ALU) circuitry, floating point unit (FPU) circuitry, and a combinatorial logic block, for example, which may be used to execute instructions by performing an operation on data (e.g., one or more operands). As used herein, an operation may include, for example, a Boolean operation, such as AND, OR, NOT, NOT, NAND, NOR, and XOR, and/or other operations (e.g., invert, shift, arithmetic, statistics, among many other possible operations). For example, functional unit circuitry may be used to perform the arithmetic operations, such as addition, subtraction, multiplication, and division on operands, via a number of operations.

A number of components in an electronic system may be involved in providing instructions to the functional unit circuitry for execution. The instructions may be executed, for instance, by a processing resource such as a controller and/or host processor. Data (e.g., the data on which the instructions may be executed) may be stored in a memory array that is accessible by the functional unit circuitry. The instructions and/or data may be retrieved from the memory array and sequenced and/or buffered before the functional unit circuitry begins to execute instructions on the data.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Fused-multiply-add (FMA) and matrix multiplication operations are used in many applications, such as in machine learning, image processing, artificial intelligence, system modeling (e.g., electrical systems, mechanical systems, etc.), and many others. The logic of these operations may be relatively simple (e.g., multiply and accumulate). However, conventional computer-based computations may involve processor and memory intensive operations, including transferring large amounts of data between compute cores and memory arrays.

In many instances, processing resources (e.g., processor and associated functional unit circuitry) may be external to the memory array, and data is accessed via a bus between the processing resources and the memory array to execute a set of instructions. Processing performance may be improved in a processor-in-memory (PIM) device, in which a processor may be implemented internally and/or near to a memory (e.g., directly on a same chip as the memory array). A PIM device may save time and/or conserve power by reducing and eliminating external communications.

Techniques described herein may also be applicable to processing in storage (e.g., processing in NAND or NOR Flash, 3D XPoint™ (a 3D crosspoint memory device commercially available from Micron Technology, Inc.), or the like). PIM may also be referred to as compute in memory or compute in storage. In other words, this disclosure contemplates processing or computation in devices often associated with storing or organizing data such as memory or storage, which, in some architectures, are distinct from a CPU, GPU, GPGPU, FPGA, ASIC, or the like.

Figure 1:
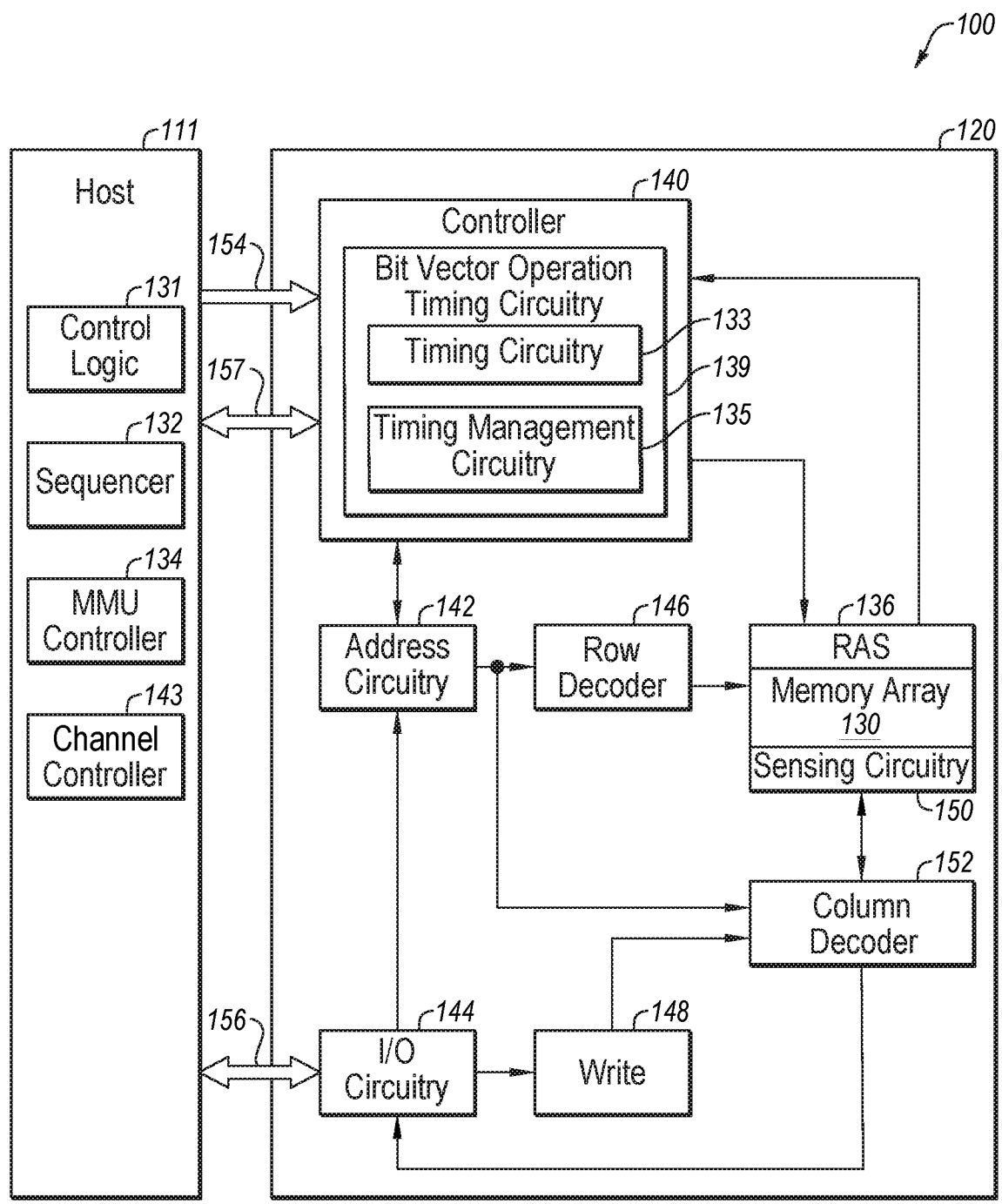
FIG. 1 shows a block diagram of a system including a memory device, in accordance with a number of embodiments of the present disclosure.

FIG. 1 is a block diagram of a system 100 including a memory device 120, in accordance with a number of embodiments of the present disclosure. Memory device 120, which may also be referred to herein as a "PIM capable device" or "PIM capable memory device," may include any suitable memory device. For example, memory device 120 may include volatile memory (e.g., RAM, DRAM, without limitation) and/or non-volatile memory (e.g., flash memory, a crosspoint memory device such as a 3D crosspoint memory device, without limitation). Memory device 120 may include a memory array 130 (i.e., including memory cells) coupled to sensing circuitry, as described in more detail below. According to some embodiments, memory device 120 may include multiple memory arrays 130 organized in banks, ranks, decks, plains, blocks, segments or some other form.

System 100 further includes a host 111 coupled to memory device 120. Host 111 may include a host system such as a personal laptop computer, a desktop computer, a digital camera, a smart phone, or a memory card reader, among various other types of hosts. Host 111 may include a system motherboard and/or backplane and may include a number of processing resources (e.g., one or more processors, microprocessors, or some other type of controlling circuitry). System 100 may include separate integrated circuits or both host 111 and memory device 120 may be part of the same integrated circuit (e.g., on a same chip). System 100 may include, for instance, a server system and/or a high-performance computing (HPC) system and/or a portion thereof.

Host 111 may include various components including PIM control components (e.g., control logic 131, a sequencer 132), a channel controller 143, and a memory management unit (MMU) controller 134. Control logic 131 may be configured to execute control flow commands associated with an executing PIM program and to provide composite commands to sequencer 132. Control logic 131 may be, or may include, a RISC type controller configured to generate and issue an extensible set of composite operation PIM commands that includes commands different from DDR commands sent to sequencer 132. In some embodiments, control logic 131 may be configured to issue composite operation commands to cause bit vector operations to be performed on memory device 120. In some embodiments, the composite operation commands may be transferred from control logic 131 to memory device 120 (e.g., via sequencer 132 and channel 157).

Control logic 131 may, in some embodiments, decode microcode instructions into function calls, which may be microcode function calls, associated with performing a bit vector operation, implemented by sequencer 132. The microcode function calls may be the operations that sequencer 132 receives and/or executes to cause memory device 120 to perform particular bit vector operations using the sensing circuitry, such as sensing circuitry 150.

As shown in FIG. 1, control logic 131 and MMU controller 134 are located on host 111, which may allow for control logic 131 and/or MMU controller 134 to access virtual addresses stored on host 111 and perform virtual to physical address resolution (e.g., translating a virtual address of an address space associated with an application running on the host 111 with actual physical address of the memory device 120) prior to transferring instructions to memory device 120. The translation may be performed at a host by looking up address translation tables stored in memory device 120 (e.g., page tables) or by performing the same on memory device 120. In some embodiments, control logic 131 and/or sequencer 132 are located in memory device 120, for instance in controller 140 or in row decoder 146. In other embodiments, control logic 131, sequencer 132, or MMU controller 134 may be distributed such that part of their functionality is located on host 111 and another part on memory device 120.

As used herein, a "bit vector" may refer to a physically contiguous number of bits, whether physically contiguous in rows (e.g., horizontally oriented) or columns (e.g., vertically oriented). A PIM capable device may be configured to perform bit vector operations such as logical operations and/or transfer operations on a number of contiguous portions (e.g., "chunks") of physical address space. As a non-limiting example, a chunk of physical address space may have a bit length of 256 bits. A chunk may or may not be contiguous sequentially to other chunks in the virtual address space, however, it will be contiguous within a scope of a memory page. In disclosed embodiments, A PIM capable device may be configured to perform the said operations in virtual address space after translation of virtual addresses of virtual pages to physical addresses of physical pages.

MMU controller 134, which may reside on host 111 (as shown in FIG. 1), may be responsible for performing the translation of virtual memory addresses (e.g., addresses associated with the host 111) to physical addresses (e.g., addresses associated with the memory device 120). MMU controller 134 may also perform memory protection operations, cache control, and/or bus arbitration operations.

Timing circuitry 133 may provide timing to coordinate performance of logical operations and may be responsible for providing conflict free access to arrays, such as memory array 130 in FIG. 1. In various embodiments, controller 140 and/or the timing management circuitry 135 may generate status information, which may be transferred to or from host 111, for example, via channel 157. Channel 157 may be independent of (e.g., separate from) a memory interface (e.g., control bus 154) that may be used to transfer commands between a host 111 and a memory device 120, a memory access device, or another memory interface. Non-limiting examples of a memory interface include a double data rate (DDR) memory interface, a peripheral component interconnect express (PCIe) memory interface, a coherent accelerator processor interface (CAPI), compute express link (CXL), cache coherent interconnect for accelerators (CCIX), and combinations and subcombinations of the foregoing, without limitation.

As a non-limiting example, a DDR memory interface (e.g., control bus 154) may be used to transfer (e.g., pass) DDR commands between host 111 and memory device 120. That is, in some embodiments, channel 157 may be used to transfer commands to cause performance of bit vector operations from host 111 to memory device 120, while control bus 154 may be used to transfer DRAM commands (or commands of another type of memory interface) from host 111 to memory device 120. In some embodiments, the DRAM commands (or other types of commands) that are transferred via control bus 154 may be commands to control operation of DRAM (or commands to control other types of memory, memory access devices, or memory interfaces)

such as DDR1 SDRAM, DDR2 SDRAM, DDR3 SDRAM, DDR4, DDR5 and other versions of a DDR type protocol, without limitation. In other embodiments, memory device 120 may signal to host about readiness of operations via channel 157. In some embodiments, channel 157 is combined with control bus 154 and/or data bus 156. Further, in some embodiments, host 111 may include multiple memory devices 120 with multiple channels and/or control buses.

In some embodiments, sequencer 132 may include an instruction controller such as a very large instruction word (VLIW) type controller or a single instruction multiple data (SIMD) type controller, configured to operate on logical operation commands and control logic 131 may be configured to issue the logical operation commands to sequencer 132 in response to a signal from a processing resource (e.g., CPU or GPU) (not shown) of host 111. For example, sequencer 132 may be configured to sequence multiple logical operations such that composite operation commands may be issued by sequencer 132. Control logic 131 may, in some embodiments, be configured to generate an executable instruction such as a VLIW type instructions or an SIMD type instructions. In an embodiment including a VLIW type instruction controller, control logic 131 may be configured to generate a VLIW as a bit vector operation command(s). The VLIW may comprise microcode instructions. Sequencer 132 may be, or may include, the VLIW type controller configured to decode the VLIW into a plurality of separate microcode instructions. For example, sequencer 132 may decode the VLIW into instructions to cause performance of composite operations (e.g., ADD, MULTIPLY, DOT PRODUCT, without limitation). In some embodiments, the composite operation commands may provide an entry point into a sequence of VLIW instructions to cause perform such composite operations. In an embodiment including an SIMD type instruction controller, control logic 131 may be configured to generate a unit of data, such as a vector of data, without limitation, and sequencer 132 may cause execution of a single instruction in parallel on multiple data points identified in the unit of data.

Sequencer 132 may be coupled to memory device 120 and may pass commands to coordinate bit vector operations to memory device 120 via channel 157. Microcode instructions may be executable in sequence and/or in parallel by sequencer 132 itself and/or by other components in the memory device 120 (e.g., bit vector operation timing circuitry 139, timing circuitry 133, timing management circuitry 135, and/or sensing circuitry 150).

Memory array 130 may include a DRAM array, SRAM array, STT RAM array, PCRAM array, TRAM array, RRAM array, NAND flash array, and/or NOR flash array, for instance. Memory array 130 may include memory cells arranged in rows coupled by access lines, which may also be referred to herein as word lines or select lines, and columns coupled by sense lines, which may also be referred to herein as data lines, digit lines, or bit lines. Although a single memory array is shown in FIG. 1, embodiments are not so limited. For instance, memory device 120 may include a number of memory arrays 130 (e.g., a number of banks of DRAM cells, NAND flash cells, etc.).

Memory device 120 includes address circuitry 142 to latch address signals for data provided over a data bus 156 (e.g., a data/address bus) through I/O circuitry 144. Status and/or exception information may be provided from controller 140 on memory device 120 to a channel controller 143, through an interface (e.g., a high speed interface (HSI)) including channel 157. Address signals are received through address circuitry 142 and decoded by a row decoder 146 and a column decoder 152 to access memory array 130. Data may be read from memory array 130 by sensing the state of memory cells on the digit lines using sensing circuitry 150. The state of memory cells may be sensed as, for example, voltage and/or current changes, magnetic state changes, resistivity, and quantum state, and so on, depending on the memory cell technology. Sensing circuitry 150 may read and latch a page (e.g., row) of data from memory array 130. I/O circuitry 144 may be used for bi-directional data communication with host 111 over data bus 156. Write circuitry 148 can be used to write data to memory array 130. In some embodiments, write circuitry 148 is combined with sensing circuitry 150. In other embodiments, sensing circuitry 150 can be a part of column decoder 152 and/or row decoder 146. In some embodiments, control bus 154 may serve as both a control and address bus for DRAM control and addressing (e.g., in accordance with a DDR protocol in which control bus 154 operates as a unidirectional data bus). Although shown as separate buses in FIG. 1, in some embodiments, control bus 154 and data bus 156 may not be separate buses.

Controller 140 (e.g., memory controller) may decode signals provided by control bus 154 from host 111. These signals can include chip enable signals, write enable signals, and address latch signals that are used to control DRAM operations performed on memory array 130, including data read, data write, and data erase operations. In various embodiments, controller 140 may be responsible for executing instructions from host 111 and sequencing access to memory array 130. Controller 140 may include a state machine, sequencer, or some other type of controller and include hardware and/or firmware (e.g., microcode instructions) in the form of an application specific integrated circuit (ASIC). In a number of embodiments, controller 140 may include bit vector operation timing circuitry 139. Controller 140 may control, for example, sensing circuitry 150. For example, controller 140 may control generation of clock signals and application of the clock signals to compute components in association with performing bit vector operations.

As shown in FIG. 1, bit vector operation timing circuitry 139 may include timing circuitry 133 and timing management circuitry 135. Timing circuitry 133 may include a FIFO buffer to provide timing coordination with sensing circuitry 150 associated with memory array 130 of memory cells. In some embodiments, timing circuitry 133 may include a state machine, such as an atomic state machine.

Timing management circuitry 135 may be configured to coordinate timing of logical operations (e.g., a sequence of logical operations), associated with the bit vector operation, performed using a row address strobe (RAS)/column address strobe (CAS) component 136 associated with memory array 130. RAS component 136 may be configured to send and/or receive a signal (e.g., RAS/CAS signal) to or from memory array 130 to identify and/or select a row and/or column address of memory array 130. Memory device 120 may, in some embodiments, be configured to execute a DRAM operation such as a memory array access request, which may be issued by host 111 via control bus 154. In some embodiments, timing management circuitry 135 may be configured to execute instructions to control timing of performance of a bit vector operation.

In one or more embodiments, portions of controller 140, (e.g., bit vector operation timing circuitry 139, timing circuitry 133, and/or timing management circuitry 135), may include a reduced instruction set computer (RISC) type controller operating on, for example, 32 and/or 64 bit length instructions. In various embodiments, timing management circuitry 135 may be responsible for executing instructions received from timing circuitry 133 to cause performance of bit vector operations involving data values associated with sensing circuitry 150.

As described further below, in a number of embodiments, sensing circuitry 150 may include a plurality of sensing components, which can each include a sense amplifier and a compute component. The compute component may serve as an accumulator, and sensing circuitry 150 may be used to perform bit vector operations (e.g., on data associated with complementary digit lines). In a number of embodiments, sensing circuitry 150 may be used to perform bit vector operations using data stored in memory array 130 as inputs and/or store the results of the operations back to the memory array 130 without transferring data via a digit line address access (e.g., without firing a column decode signal). For instance, various operations (e.g., bit vector operations) may be performed using, and within, sensing circuitry 150 rather than (or in association with) being performed by processing resources external to sensing circuitry 150 (e.g., by a processing resource associated with host 111 and/or other processing circuitry, such as ALU circuitry, located on memory device 120 (e.g., on controller 140 or elsewhere)). In a number of embodiments, sensing circuitry 150 (e.g., the number of sensing components) may be used to execute bit vector operations in a SIMD (single instruction multiple data) manner with the sensing components serving as 1-bit processing elements on a per column basis.

In other embodiments, neighboring sensing components may exchange data bits amongst each other, thus producing computation based on multiple data sources. In other embodiments, sensing components may produce different computation depending on their location within sensing circuitry 150, thus, providing computation in VLIW or SIMD manner. In embodiments in which sensing circuitry 150 executes bit vector operations, sensing circuitry 150 may serve as and/or be referred to as an "in memory processor." As described more fully below, in some embodiments, sensing circuitry 150 may include a sequencer (e.g., similar to sequencer 132).

In various approaches, data associated with an operand, for instance, may be read from memory via sensing circuitry and provided to external memory array ALU circuitry via I/O lines (e.g., via local I/O lines and/or global I/O lines). The external memory array ALU circuitry may include a number of registers and would perform bit vector operations using the operands, and the result may be transferred back to the array via the I/O lines. In other embodiments, sensing circuitry 150 is configured to perform bit vector operations on data stored in memory array 130 and store the result back to the memory array 130 without enabling an I/O line (e.g., a local I/O line) coupled to sensing circuitry 150.

In a number of embodiments, circuitry external to memory array 130 and sensing circuitry 150 may not be needed to perform operations as sensing circuitry 150 may perform the appropriate bit vector operations without the use of an external processing resource. Therefore, sensing circuitry 150 may be used to compliment and/or to replace, at least to some extent, such an external processing resource (or at least the bandwidth consumption of such an external processing resource). However, in a number of embodiments, sensing circuitry 150 may be used to perform logical operations (e.g., to execute instructions, without limitation) in addition to logical operations performed by an external processing resource (e.g., host 111, without limitation). For instance, host 111 and/or sensing circuitry 150 may be limited to performing only certain logical operations and/or a certain number of logical operations.

Enabling an I/O line can include enabling (e.g., turning on, without limitation) a transistor having a gate coupled to a decode signal (e.g., a column decode signal, without limitation) and a source/drain coupled to the I/O line. However, embodiments are not limited to performing logical operations using sensing circuitry (e.g., sensing circuitry 150, without limitation) without enabling column decode lines of the array. Whether or not local I/O lines are used in association with performing logical operations via sensing circuitry 150, the local I/O line(s) may be enabled in order to transfer a result to a suitable location other than back to the memory array 130 (e.g., to an external register, without limitation).

Various embodiments of the disclosure relate to fused-multiply-add (FMA) operations, and more specifically to performing processing-in-memory (PIM) FMA operations. According to various embodiment, data, which is to be used in one or more computations, may be accessed (e.g., by a sequencer, without limitation) and reused across a number of bits (e.g., loaded into a sense amplifier array via a number of data lines, without limitation). Stated another way, various embodiments may relate to reusing sequencer logic across a number of bits associated with a number of data lines. Thus, in comparison to conventional methods and systems, a number of memory loads and memory stores may be reduced, and thus efficiency of a memory device may be increased and/or latency associated with the memory device may be reduced.

For at least these reasons, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

For matrix multiplication, both central processing units (CPUs) and graphics processing units (GPU) may break down input matrices into tiles, and the tiles may be allocated to processor cores. For each tile of an output matrix, tiles of input matrices are fetched exactly once, which achieves near O(N) compute intensity (i.e., processing will increase linearly and in direct proportion to the size of the input data set). The size of each tile of the output matrix may be selected to match a capacity of a level L1 cache or registers of a target processor.

For GPUs, tiles are selected such that the tiles form a hierarchy of thread block tiles, warp tiles, and thread tiles. This tile structure creates paths for data movement from global memory to shared memory (i.e., matrix to thread block tile), from shared memory to the register file (i.e., thread block tile to warp tile), and from the register file to the GPU cores for computational result (i.e., warp tile to thread tile).

In PIM, other than memory arrays (e.g., DRAM arrays, without limitation) and one or more registers (e.g., within a sense amplifier (SA) array, without limitation), memory constitute large portion of memory hierarchy. However, as described more fully herein, according to various embodiments, data may be reused in PIM FMA operations by computation on a data line or within local to memory data lines registers.

Figure 2:
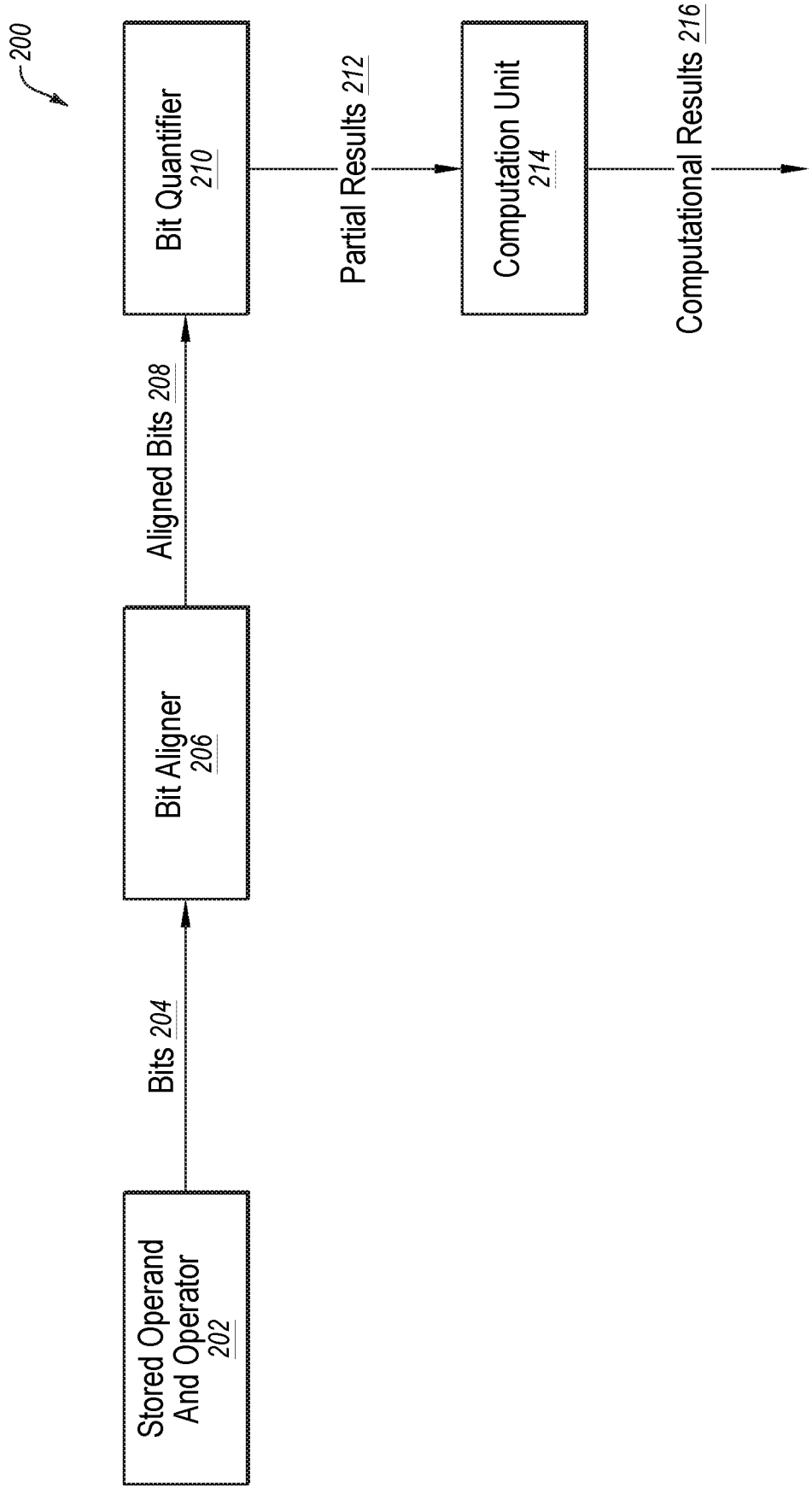
FIG. 2 shows a functional block diagram of system 200 in accordance with one or more embodiments.

FIG. 2 shows a functional block diagram of a system 200 for performing spatiotemporal FMA, in accordance with one or more embodiments. System 200 may include a stored operand and operator 202, bit aligner 206, bit quantifier 210, and computation unit 214.

Stored operand and operator 202 may be configured, generally, to access and receive bit sequences for operands and/or operators stored in a portion of a memory array (e.g., memory array 130, without limitation). In one or more embodiments, stored operand and operator 202 may include one or more data lines for receiving bits of data, and one or more access lines for accessing bits of data via the data lines.

Bit aligner 206 may be configured, generally, to receive bits 204 that include bits of data corresponding to operands and operators, perform one or more alignments of bits of an operand in response to bits of an operator, and provide aligned bits 208. For a performed bit alignment, bit aligner 206 may be configured to provide aligned bits 208. Bit quantifier 210 may be configured, generally, to determine a quantity bits of aligned bits 208 that have a predetermined value (e.g., "1" or "0," without limitation). Computation unit 214 may be configured, generally, to determine a computational result 216 based, at least in part, on partial results 212.

In a contemplated operation of system 200, bit aligner 206 may receive bits 204, which includes bits of an operand and bits of an operator, respectively of stored operand and operator 202. Bit aligner 206 may provide aligned bits 208, which correspond to one or more of the bits of an operand, and more specifically, bits at aligned bit locations of an operand. Bit quantifier 210 may receive aligned bits 208, and may provide partial results 212, which are representative of a determined quantity of bits in aligned bits 208 having a predetermined value. Computation unit 214 may receive a number of partial results 212, combine the number of partial results 212 (as more fully described later herein), and provide computational result 216.

Figure 3:
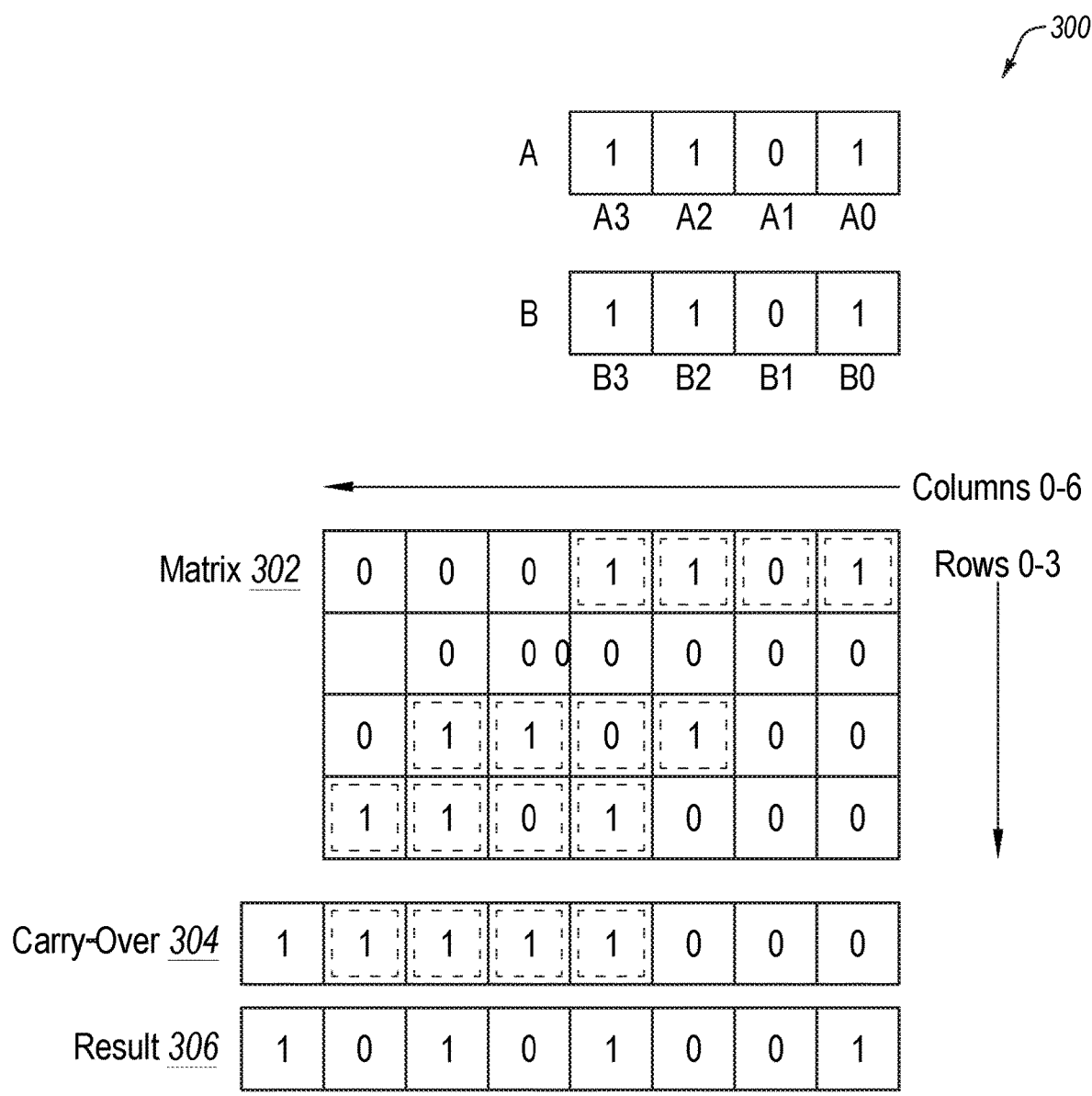
FIG. 3 shows a diagram of spatiotemporal FMA, in accordance with one or more embodiments.

FIG. 3 shows a diagram for a spatiotemporal FMA 300, in accordance with one or more embodiments. For this specific non-limiting example embodiment, shown are a bit sequence for an operand "A," a bit sequence for an operator "B," a matrix 302 that includes bit values used for partial computational results of spatiotemporal FMA 300, a carry-over 304 that includes carry-over values computed during computation of various partial computational results, and a result 306 that includes a bit sequence for a result of spatiotemporal FMA 300.

In the example embodiment shown and discussed with reference to FIG. 3, matrix 302 is merely a convenient construct to represent bit alignment (e.g., by bit aligner 206, without limitation) used in embodiments of spatiotemporal FMA. Notably, a matrix is not necessarily created during or in connection with embodiments of spatiotemporal FMA. Indeed, matrix 302 shows alignments of various bit positions and bits of operand A by in-memory circuitry (e.g., by bit aligner 206, without limitation) during spatiotemporal FMA 300, which respective bit values may be quantified (e.g., by bit quantifier 210, without limitation) and combined to generate a computational result (e.g., by computation unit 214, without limitation).

In the example embodiment of FIG. 3, operand A includes bit values 1 1 0 1 for bits at respective bit positions A3, A2, A1 and A0. Further, operator B includes bit values 1 1 0 1 for bits at respective bit positions B3, B2, B1 and B0. Each column of matrix 302, i.e., $Col_0$ to $Col_6$, represents an aligning of bit positions and respective bits of operand A and a carry bit C. Each specific alignment is in response to bit values of bits of operator B. Stated another way, bit positions of bits of operator B having a bit value of 1 dictates whether and which bit values of operand A are in a given cell of a given row/column of matrix 302. Each specific bit in a cell of result 306 represents a quantification of aligned bits corresponding to a column of matrix 302 and a carry bit.

In the example embodiment of FIG. 3, matrix 302 is an N×M (i.e., N rows by M column) matrix. For each row of matrix 302, a bit value of a corresponding bit position of operator B dictates whether or not bit values of A are in any cells of a row. If a corresponding bit value of B is a "1" then bit values of A are in some of the cells of a row, but if a corresponding bit value of B is a "0" then all cells for a row are a "0." Notably, other conventions may be used, such as using a "0" to dictate that bit values of A are in cells of a row and a "1" to dictate that all cells for a row are a "0." Bit values of operator B, from the bit position of least-significant-bit B0 to the bit position of most-significant-bit B3 dictate $Row_0$ to $Row_3$, respectively. At each row of matrix 302 for which operator B dictates use of the bit values of operand A, bit values of operand A are used in order of least-significant-bit A0 to most-significant-bit A3.

In each row, cell positions for bit values of $A_0$ to $A_3$ are selected to align in each column, e.g., in one or more of $Col_0$ to $Col_7$, without limitation, bit values of operand A for summation. Each column of matrix 302 (as well as corresponding bit position of carry-over 304) represents a partial computational result of spatiotemporal FMA 300. Notably, summation can be performed by selecting subsets of rows and performing summation within columns of selected subsets. Such subset selection may be performed in any order including an arbitrary order. Further, subsets of rows may be summed into partial computational results and the partial computational results may be summed. In some embodiments, selecting subsets may be done according to an ordering algorithm, such as a logarithmic ordering algorithm, without limitation. As a non-limiting example, a logarithmic ordering algorithm may be log_L(B) steps, where L is a hardware limitation (e.g., 2 rows in a subset of rows or 3 rows in a subset of rows, without limitation) and B is a number corresponding to the bit width of the operator.

In a typical multiplication of binary numbers, the multiplicand is shifted left appropriately for each non-zero bit in the multiplier, and then the shifted numbers are added together.

Bit values of bits of result 306 are obtained by summing bit values in columns of respective bit positions of result 306. In one embodiment, summation includes performing exclusive-OR(XOR) type logic operations, determining if the number of bits with value "1" is odd or even, counting the number of pairs of bits with value "1" and others.

So, if every column of matrix 302 is considered a bit alignment for a partial computation of spatiotemporal FMA 300, and each bit position of result 306 a partial result of spatiotemporal FMA 300, then spatiotemporal FMA 300 includes eight partial results for this particular example. Aligned bit positions for each partial computation contemplated by FIG. 3 are set forth in Table 1.

TABLE 1

| | bit positions of bit Sequence A Used In partial computational results | |
|---|---|---|
| Partial Computation | Bit Positions Aligned | Code |
| 0 | A0 C | 0 0 0 1 0 |
| 1 | A1 C | 0 0 1 0 0 |

TABLE 1-continued bit positions of bit Sequence A Used
In partial computational results

| Partial Computation | Bit Positions Aligned | Code |
|---|---|---|
| 2 | A2 A0 C | 0 1 0 1 0 |
| 3 | A3 A1 A0 C | 1 0 1 1 1 |
| 4 | A2 A1 C | 0 1 1 0 1 |
| 5 | A3 A2 C | 1 1 0 0 1 |
| 6 | A3 C | 1 0 0 0 1 |

The third column of Table 1 shows codes that, in one embodiment, may be determined from aligned bit positions in column 2, and further aligned with a carry-over bit C. Stated another way, groups of aligned bit positions may be represented by codes, here, digital codes.

Figure 4:
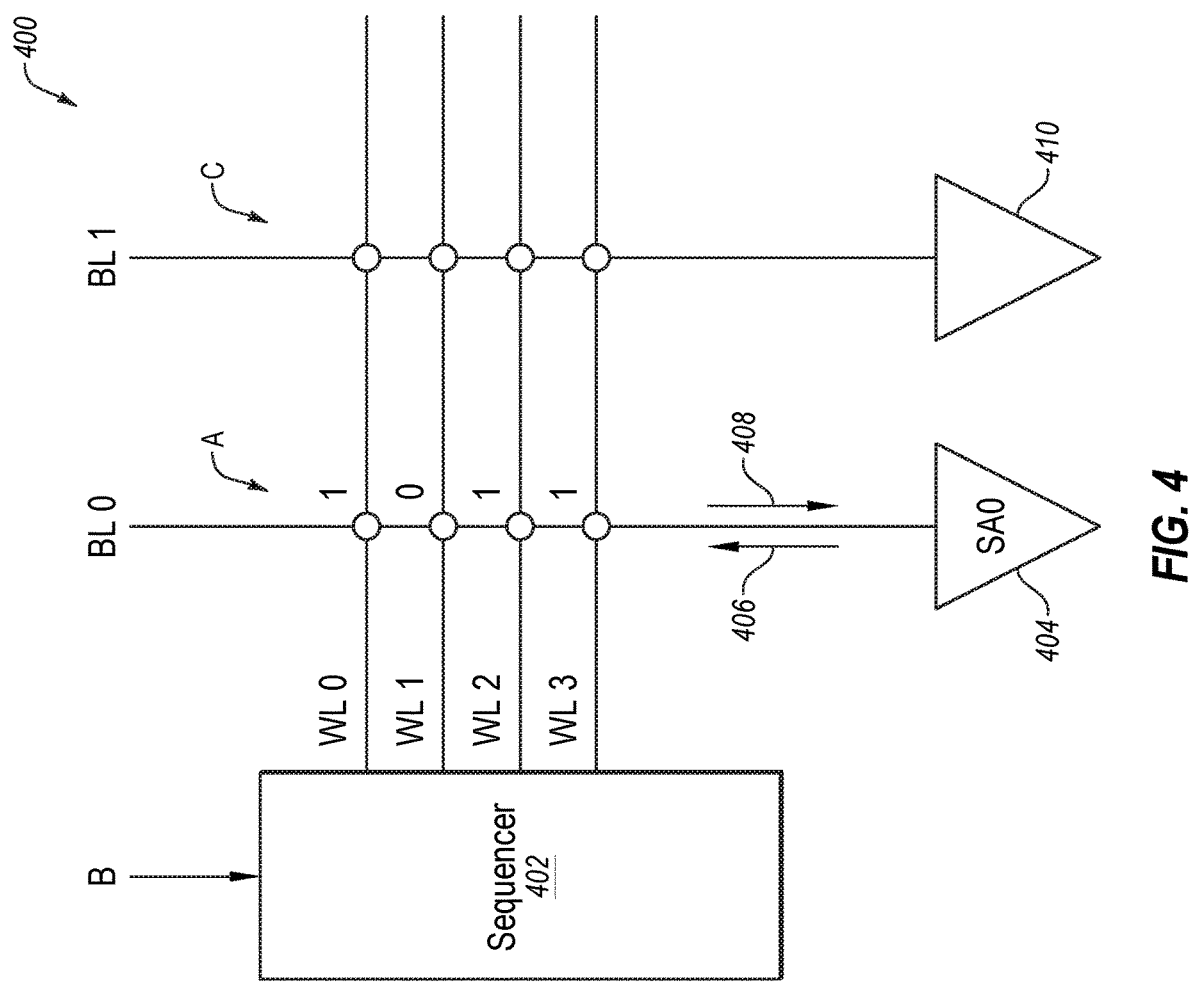
FIG. 4 shows a circuit diagram of a circuit representative of a resistive memory, in accordance with one or more embodiments.

FIG. 4 shows a circuit diagram of a sensing circuit 400 in accordance with one or more embodiments. Sensing circuit 400 may include one or more data lines (here bit lines BL0 and BL1) operatively coupled to one or more sense amplifiers and operatively coupled to one or more sequencers by one or more access lines. In the specific non-limiting example embodiment shown in FIG. 4, sensing circuit 400 includes bit lines BL0 and/or BL1 for receiving bits of operand A stored in a portion of a memory array along a bit line BL0 and operand C stored in memory array along a bit line BL1. BL0 and BL1 are operatively coupled to sequencer 402 by access lines, here word lines WL 0 to WL 3. Bit line BL0 is also operatively coupled to sense amplifier 404, and bit line BL1 is operatively coupled to sense amplifier 410. Operatively coupling an individual access line to multiple data lines is optional, and is shown in FIG. 4 to highlight several embodiments.

Using sensing circuit 400, multiple bits of operand A may be accessed at substantially the same time and computational result (e.g., quantifying accessed bits, without limitation), may be performed during such multi-bit access. In a contemplated operation of sensing circuit 400, multi-bit access may be performed by activating multiple access lines (i.e., one or more of word lines WL0 to WL3) corresponding to bit positions of operand A.

Sequencer 402 may be configured to activate one or more of word lines WL0 to WL3 that correspond to bit positions of respective groups of aligned bit positions as shown in Table 1 as well as the carry over C, which carry over may be stored locally by respective sense amplifiers (e.g., sense amplifiers 404 and 410, without limitation). In one embodiment, sequencer 402 may be configured to determinate respective bit positions of a group of aligned bit positions that correspond to a given partial computation based, at least in part, on operand A and operator B. Additionally or alternatively, in some embodiments, sequencer 402 may be configured to activate respective word lines in response to codes, such as the codes, as well as the carry, which could be stored locally by each of sense amplifiers, shown in the third column of Table 1, without limitation.

Operator B can be used as a control sequence that provides activation pattern to the word lines WL0-WL3. In some cases, B may be a common operator (e.g., multiplier, without limitation) for many operands. In such cases many multiplication operations may be performed on multiple units of data, in parallel (i.e., substantially simultaneously), as discussed herein.

Turning back to the contemplated operation of sensing circuit 400, sequencer 402 activates word lines WL 0 and WL 2 to access A0 and A2 (i.e., partial computational result 2 in Table 1), both bits are made available to sense amplifier 404 for a computational result that occurs during their access via bit line BL0. Sense amplifier 404, which is operatively coupled to BL 0, quantifies a number of accessed bits on bit line BL 0 that are a bit value "1" at a given instant (e.g., for a given access operation, without limitation). Upon multiple activated bits on bit line BL0, sense amplifier 404 may immediately provide a result of a computational result (e.g., a partial result provided in response to a partial computational result, without limitation).

In one or more embodiments, sense amplifiers (e.g., sense amplifier 404, without limitation) may be configured to distinguish (i.e., resolve) one or more states of activated bits on data lines (e.g., bit lines BL0 and BL1, without limitation). Generally, for N simultaneously activated bits on a bit line of sensing circuit 400, in one or more embodiments a state truth table provide N+1 states: a $1^{st}$ state when all bits are 0, a $2^{nd}$ state when exactly 1 bit has value 1, a $3^{rd}$ state when exactly 2 bits have value 1, . . . , and an Nth state when exactly N−1 bits have value 1, N+1th state when all N bits have value 1. Thus, a truth table essentially counts how many bits with value 1 are activated on bit line regardless their positions. Such truth table can be implemented as a circuit in addition to or as a part of a sense amplifier, alternatively it can be stored in memory or registers near each sense amplifier as a look-up table, alternatively the sequencer can convey the table values upon request of sense amplifiers or unconditionally.

Table 2 shows a truth table in accordance with one or more embodiments, and in particular, corresponding to the example embodiment of FIGS. 2 and 3.

TABLE 2

Truth Table

| Bits | 0 | 0 | 0 | 1 | 0 | 1 | 1 | 1 |
| | 0 | 0 | 1 | 0 | 1 | 0 | 1 | 1 |
| | 0 | 1 | 0 | 0 | 1 | 1 | 0 | 1 |
| States | State 1 | | State 2 | | | State 3 | | State 4 |
| XOR | 0 | | 1 | | | 0 | | 1 |
| Carry | 0 | | 0 | | | 1 | | 1 |

In one or more embodiments, sense amplifier 404 may include one or more sense amplifiers configured to resolve all N states of BL 0. In one embodiment, sense amplifier 404 may be configured to resolve all N states of a circuit (e.g., sensing circuit 400, without limitation). In such an embodiment, all bits of BL 0 may be accessed contemporaneously or concurrently.

In another embodiment, sense amplifier 404 may be configured to resolve fewer than N states (i.e., N−1 or fewer states). In such an embodiment, sequencer 402 may be configured to activate a subset of bits of BL 0 sequentially. Using an example of a sense amplifier 404 configured to resolve two states, sequencer 402 may be configured to activate up to two bits at bit line BL 0 at a time. In this manner, sense amplifier 404 may operate on up to two activated bits on bit line BL0 in each access operation and accumulate the results. As a non-limiting example, sense amplifier 404 may operate on the first two activated bits and the carry of a code in "Code" column of Table 1, and then operate on the second two activated bits of the same code and the carry of the code, and then combine these partial computations into combined partial computation.

Alternatively, these partial computations can be done concurrently by two different sets of sense amplifiers interfacing two different sets of bit lines having the same operands. The sequencing of both sets of bits may be performed according to the first 2 bits of codes in the first set of sense amplifiers and the second 2 bits of codes in the second set of sense amplifiers. Combining, or in this case summation, of partial results of both sets of sense amplifiers could be done concurrently with or subsequently to generating the partial computations by these sets. Notably, selecting the bit positions of codes for each set may be performed in any order including an arbitrary order (e.g., all first bits with all forth bits in one set, all second bits and all third bits in another set). Then partial computational results may be summed. In some embodiments, partial computations may be summed according to an ordering algorithm. Non-limiting examples of an ordering algorithm include a logarithmic ordering algorithm. As a non-limiting example, a logarithmic ordering algorithm may be log_L(B) steps, where L is a hardware limitation (e.g., 2 units of 2-limited activation corresponding to 2 bit positions in the "Codes" or 3 units of 3-limited activation corresponding to 3 bit positions in the "Codes" selected for a set of sense amp, without limitation) and B is a number corresponding to the bit width of the operators.

While the truth table of Table 2 is an example of simultaneous 2 bit sensing—i.e., determining a computational result using 2 bit state table—it should be appreciated that a 3-bit, 4-bit, and so on up to N-bit state truth table may be used in one or more embodiments. Notably, the complexity of circuitry temporarily formed due to activation will typically be proportional to the number of bits used in a truth table.

Regarding carry-over, carry-over is a count of a number of 1's that are "carried over" from a previous simultaneous activation, such number corresponds to the number of pairs of bits with value "1" from the last simultaneous activation (including its carry value when determining the pairs). In some cases, a max carry will depend on the state table: 1 for 2-bit state table, 2 for 3-bit state table, 3 for 4-bit state table, etc. So, the more simultaneous activations during a partial computation, the greater the max quantity of possible 1's carried over.

In one embodiment, to include a carry-over from a previous partial computation in a current partial computation, a strength of an activation driver (e.g., a current source, voltage source, or reference resistor, without limitation) may be scaled as a function of the carry-over from the previous partial computation.

In another embodiment, carry-over from the previous partial computation may be computed as a digital value having a number of "1" equal to the carry-over, and the digital value is summed with the bits of the activated bit positions to calculate a result. As non-limiting examples, a digital value for a carry may be stored in a look-up-table or a circuit. The digital value may be looked up, kept digitally at a sense amplifier, and combined digitally with subsequent partial computation results and carry.

In yet another embodiment, a carry-over may be stored as a charge or resistance value substantially equal to a charge or resistance value of a "1" multiplied by the carry-over, and then integrated with the result over one or more passes. The charge/resistance value may be stored as an additional number of memory cells programmed with this charge/resistance value (e.g., local to sense amplifier, without limitation), the number of cells corresponding to the value of carry-over to be integrated with results.

As mentioned above, in some cases B may be a common operator for multiple operands. In such cases, multiple computations, or portions thereof, may be performed in parallel (i.e., substantially simultaneously) using multiple operands. As mentioned above, and in accordance with one or more embodiments, FIG. 4 shows optional operative coupling to a second bit line, BL1 and an operand C located at BL1, the operand C may store different value than operand A.

In a contemplated multi-access operation of sensing circuit 400, sequencer 402 activates WL 0 and WL 2 to access A0 and A2 for a first computation, and to access C0 and C2 for a second computation, concurrently. Bits at A0, A2, C0 and C2 are made available for the computational results that occur during access of respective bit positions of BL0 and BL1. Sense amplifier 410, which is operatively coupled to BL1, may be configured to quantify a number of accessed bits at BL1 similar to sense amplifier 404 described above (e.g., configured to quantify a number of accessed bits on BL 1 that are a bit value "1" at a given instant, without limitation). Upon multiple bits of BL0 and BL1 being activated, sense amplifier 404 and sense amplifier 410 may immediately provide respective results of computational results (e.g., a partial result provided in response to a partial computational result, without limitation).

Figure 5:
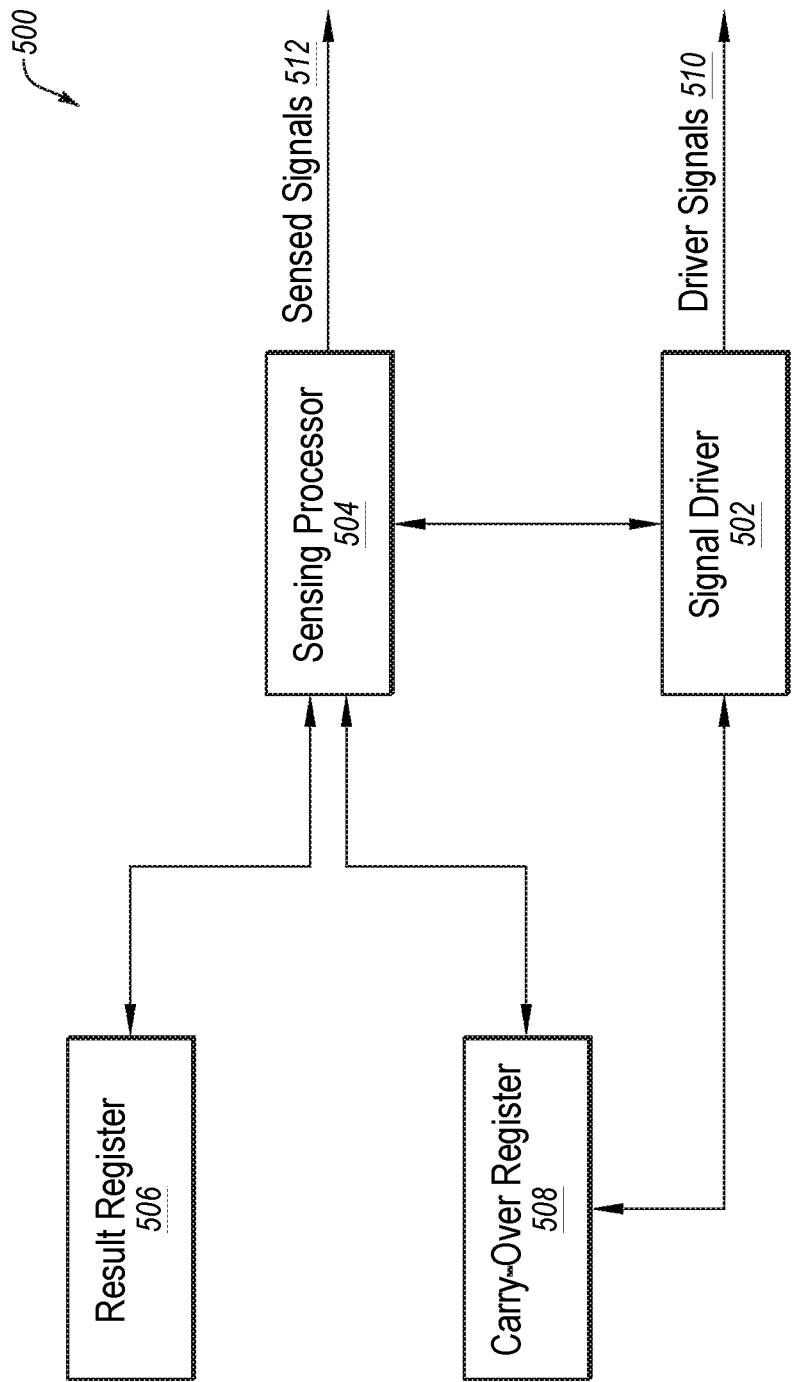
FIG. 5 shows a functional block diagram of a sense amp controller, in accordance with one or more embodiments.

FIG. 5 shows a functional block diagram of an embodiment of a sense amp controller 500. During one or more partial computations, sense amp controller 500 may be configured, generally, to perform one or more operations of embodiments of spatiotemporal FMA described herein. In the specific non-limiting example embodiment shown in FIG. 5, sense amp controller 500 includes signal driver 502, sensing processor 504, result register 506 and carry-over register 508. Sense amp controller 500 may optionally include other registers. In some embodiments, signal driver 502 may be combined with sensing processor 504 in one functional unit. In some embodiments, sense amp controller 500 may include a first signal driver 502/sensing processor 504 pair for word lines and a second signal driver 502/sensing processor 504 pair for bit lines. In some embodiments, sensing and driving may be implemented at one or both of an access line and a data line.

Signal driver 502 may be configured to provide driver signals 510 for driving data lines and/or access lines, for example, for providing drive signal 406 for driving bit lines and/or word lines of FIG. 4, without limitation. In one or more embodiments, signal driver 502 may be configured to provide driver signals 510 responsive to values stored in carry-over register 508. More specifically, signal driver 502 may be configured to increase or decrease a level of driver signals 510 provided during a partial computation (as compared to a driver signals 510 provided during a previous partial computation) in response to the bit values stored at carry-over register 508. In other words, scale the level of a subsequent output of signal driver 502 (whether current source, voltage source, or reference resistor, without limitation) as a function of propagated carry (i.e., the bit value stored at carry-over register 508). In another embodiment, additionally or alternatively to a driver signal, a scaled value may be obtained by operatively coupling a sensing amplifier to a number of additional bits stored local to the sense amplifier, each such additional bit storing a logic "1." The number of additional bits may correspond to a value of a carry-over to be integrated at a sensing amplifier (i.e. correspond to "C" in Bit Positions Aligned column of Table 1). Additional circuitry related to enabling these features may be needed.

Sensing processor 504 may be configured to receive sensed signals 512 from data lines, for example, to receive sense signals 408 from bit lines of FIG. 4, without limitation. Sensing processor 504 may be configured to determine partial results and carry-overs responsive to sensed signals 512, which are stored at result register 506 and carry-over register 508, respectively.

One or more embodiments relate, generally, to obtaining state information about an activated data line (e.g., bit line BL0 of FIG. 4, without limitation) and converting the state information to partial computational results and computational results determined in response to partial computational results.

In the case of memory devices without access transistors, intermediate circuitry may be formed and used to translate state information to results. Non-limiting examples of memory devices without access transistors include resistive crosspoint memory devices and capacitive crosspoint memories.

In the case of resistive crosspoint memories, such as Resistive Random-Access memory (ReRAM) or 3D XPoint (available commercially from Micron Technology, Inc.), without limitation, parallel resistive networks may be formed and used to translate state information to results.

Figure 6:
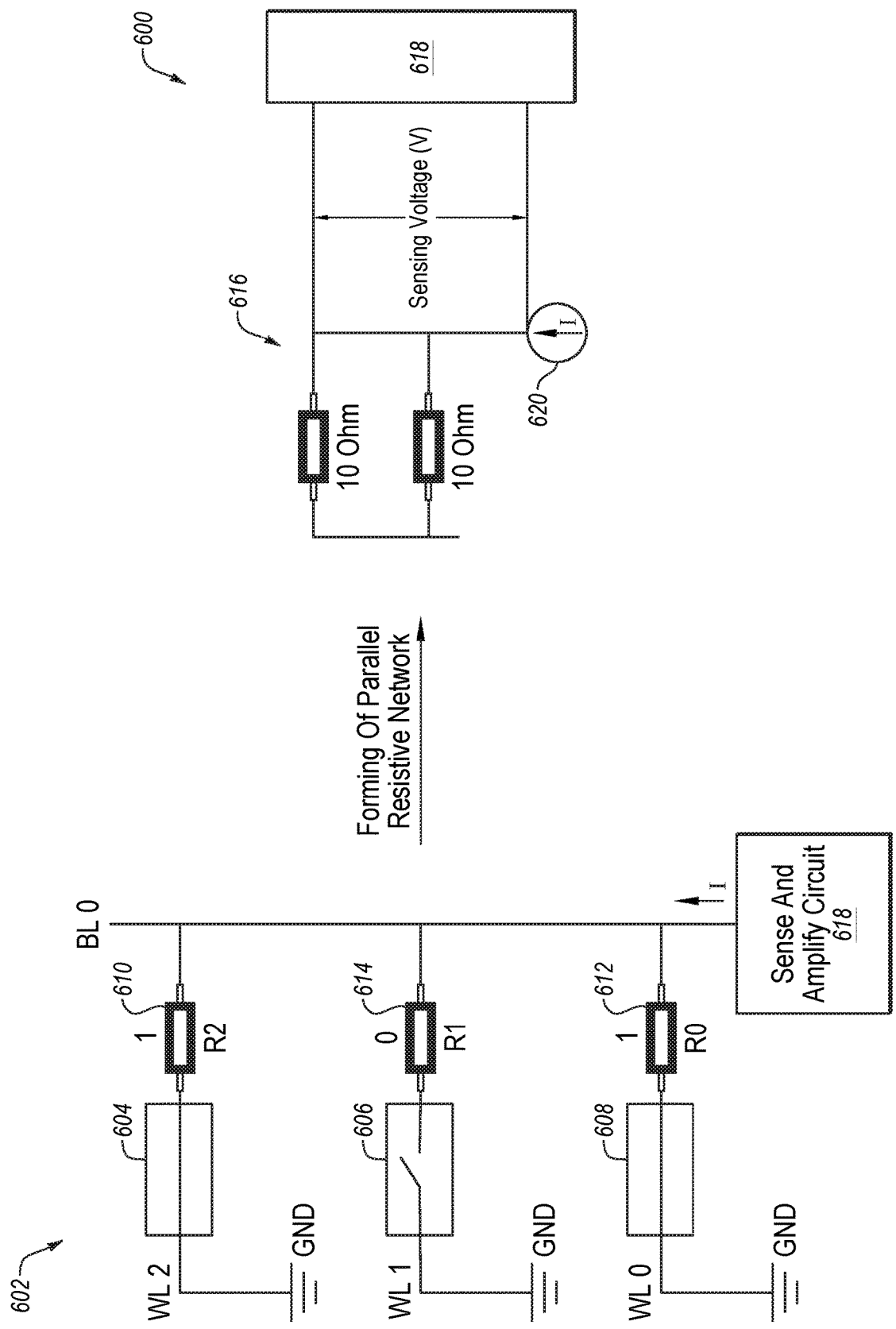
FIG. 6 shows circuit diagrams for a sensing circuit used to perform spatiotemporal FMA, in accordance with one or more embodiments.
Figure 7:
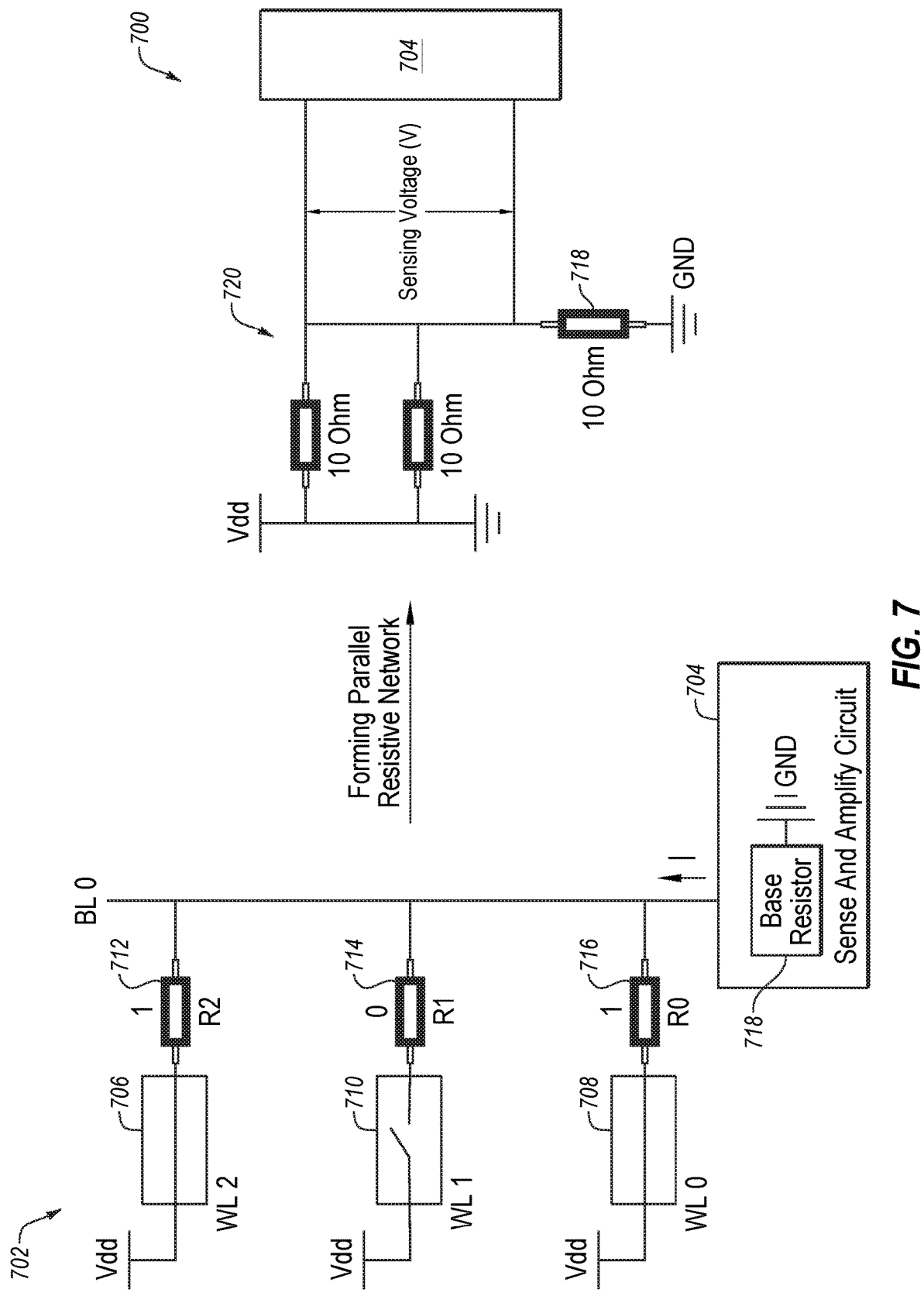
FIG. 7 shows circuit diagrams for a sensing circuit used to perform spatiotemporal FMA, in accordance with one or more embodiments.

FIG. 6 and FIG. 7 show circuit diagrams, for example, embodiments of a sensing circuit activated, temporarily, for measuring a state of a data line (e.g., measuring a state associated with activated bits on a data line, without limitation). One or more embodiments of a sensing circuit may be activated by operatively coupling access lines to a specified level, such as a specified voltage level or a specified current level, without limitation.

FIG. 6 shows an example activation of a parallel resistive network (i.e., a sensing circuit) activated temporarily from sensing circuit 400 of FIG. 4, and, more generally, corresponds to a partial computational result of COL 2 (from right to left starting at COL 0) of FIG. 3.

In the example embodiment contemplated by FIG. 6, activated sensing circuit 602 includes word lines WL 2 and WL 0 that have been activated by activation element 604 and activation element 608 (depicted in FIG. 6 as switches), which are configured to operatively couple/de-couple WL 2 and WL 0 to a specified voltage level, here ground (GND), without limitation. In one or more embodiments, activation element 604 and activation element 608 may be any suitable electronic circuit and/or device for enabling a current (e.g., current I in FIG. 6, without limitation) to flow at an access line such as word lines WL0 to WL2, for example, diodes, transistors, capacitive switches, inductive switches, current sources, and combinations of the same, without limitation.

Word line WL1 is shown in FIG. 6 merely to illustrate that, in the example operation, word line WL 1 is not operatively coupled to GND (nor is word line WL 3, which is omitted from this drawing)—i.e., activation element 606 is shown as an open switch and no current flows through resistive element 614.

Both memory cells (here, resistive element 610 and resistive element 612) contain bit value "1," which is pre-specified to correspond to a low resistive state of 10 Ohm (as opposed to a high resistive state of, e.g., 1000 Ohm, without limitation). In one or more embodiments, resistive element 610 and resistive element 612 may be any suitable electronic circuit and/or device that is selected to affect a resistance seen at an access line (here, WL 2 and WL 0), for example, a resistor, a capacitor, a wire/conductor, a transistor, and combinations of the same, without limitation.

When current I is provided to bit line BL 0, a circuit 600 is formed that includes a parallel resistive network, here sensing circuit 616, and a voltage divider, here a reference node including a current source 620.

Bit line resistance (i.e., resistance of BL 0 seen at sense and amplify circuit 618) may be determined to be $R=1/(1/10+1/10)=5$ Ohm. In a case where current source 620 is 1 AMP, voltage sensed (i.e., sensing voltage V) at the bit line may be determined to be $V=R\times I=5\times 1=5V$. Such sensed voltage is indicative of a state of bit line BL 0, and sense and amplify circuit 618 may look-up (internally) the sensed voltage and provide result and carry in response. As a non-limiting example, sense and amplify circuit 618 may include a Look-Up-Table (LUT) configured to provide result and carry information in response to value for a sensed voltage.

Notably, in the example embodiment shown in FIG. 6, when a parallel resistive network is activated in accordance with activation of parallel resistive network 616 of FIG. 6 discussed herein, a sensed voltage will typically decrease the more cells of a bit line that include a bit value 1. As a non-limiting example, in a case where a single cell includes a bit having a bit value of 1, a bit line resistance may be determined to be $R=1/(1/10+1/1000)=9.9$ Ohm, and after applying the current of 1 Amp the bit line voltage is $V=9.9V$.

As another non-limiting example, if both memory cells of activated sensing circuit 602 are in high resistance state then bit line resistance may be determined to be $R=1/(1/1000+1/1000)=500$ Ohm, and after applying the current of 1 Amp the bit line voltage is $V=500V$. In most contemplated use cases, 500V would be outside a dynamic range of a circuit and so sensed voltage would be equal to a rail voltage.

Additionally or alternatively to the embodiment described with reference to FIG. 6, in some embodiments one or more word lines may be operatively coupled to a supply voltage to activate a parallel resistive network. FIG. 7 shows a non-limiting example of a parallel resistive network activated by operatively coupling access lines of a sensing circuit (e.g., word lines of sensing circuit 400, without limitation) to a voltage source, such that signal sensing may be performed by sensing a voltage at a reference base resistor node (e.g., at a voltage divider, without limitation).

In the example embodiment shown in FIG. 7, word lines WL 2 and WL 0 are activated by operative coupling to a voltage source (e.g., Vdd, without limitation) by activation element 706 and activation element 708, respectively. Sense and amplify circuit 704 is operatively coupled to bit line BL 0 and, internally, operatively coupled to GND by an internal base resistor 718. When current I is provided to bit line BL 0, a circuit 700 is formed that includes a parallel resistive network, here sensing circuit 720, and a voltage divider, here a reference node including a base resistor 718.

Word line WL1 is shown in FIG. 7 merely show to illustrate an embodiment where word line WL 1 is not operatively coupled to VDD (nor is WL 3, which is not depicted)—i.e., activation element 710 is shown as an open switch and no current flows through resistive element 714.

In FIG. 7, word lines WL0 and WL2 are activated by operative coupling to a specified voltage level, here Vdd=10V (i.e., by activation element 708 and activation element 706). Both memory cells (here, resistive element 712 and resistive element 716) include bit value 1 which corresponds to low resistive state 10 Ohm (as opposed to high resistive state of 1000 Ohm). Bit line resistance may be determined to be $R=1/(1/10+1/10)=5$ Ohm. If base resistor 718 is 10 Ohms, a voltage sensed at BL 0 may be determined to be $V=R\_div\times Vdd=(10/15)\times 10=6.67V$. Sensed voltage may be indicative of a state of BL 0, and sense and amplify circuit 704 may be configured to look up and provide carry and result values (e.g., using as LUT as described with reference to FIG. 6, without limitation).

Notably, sensing circuit 720 is formed when forming parallel resistive network with a voltage divider, a sensed voltage will increase the more cells of a bit line that include a bit value 1. As a non-limiting example, in a scenario where only one cell has a bit with a bit value of 1, then the bit line resistance may be determined to be $R=1/(1/10+1/1000)=9.9$ Ohm, and after applying a voltage divider the $V=(10/19.9)\times 10=5V$.

As another non-limiting example, if both memory cells of activated circuit 702 are in a high resistance state then base line resistance may be determined to be $R=1/(1/1000+1/1000)=500$ Ohm, and after applying the voltage divider the bit line voltage is $V=(10/510)\times 10=0.19V$.

Notably, values for voltage, resistance, and current provided in example embodiments, including without limitation example embodiments described with reference to FIG. 6 and FIG. 7 are provided for explanatory reasons. In operation, voltages, resistance and currents may be affected by, for example, one or more of noise, intrinsic characteristics of devices, and parasitic impedances, without limitation.

Notably, one of ordinary skill in the art would appreciate numerous circuits and equivalent circuits for creating and/or performing circuits and operations described with reference to FIGS. 5-7. As a non-limiting example, sense and amplify circuits (e.g., sense and amplify circuit 618 and sense and amplify circuit 704, without limitation) including a voltage divider and a voltage source and access lines (e.g., WL 0 and WL 3, without limitation) operatively coupled to GND.

Notably, one of ordinary skill in the art would appreciate that any suitable voltage sensing technique may be used to sense voltages associated with one or more states of one or more bit lines, including without limitation by sense and amplify circuit 618 and sense and amplify circuit 704. In one or more embodiments, a voltage sensing techniques and circuitry for sensing voltages may be used that is based, at least in part, on symmetry of a cross-point resistive memory. As a non-limiting example, voltage sensing techniques that are based, at least in part, on symmetry of a cross-point resistive memory may include, but are not limited to, bi-direction voltage level sensing techniques or differential voltage level sensing techniques and multiple parallel bit line sensing techniques, and circuits implementing the same.

One or embodiments may relate, generally, to translating state information to a result for a snap-back resistive memory devices operating in saturation mode (e.g., 1D or diode-like memory cells, without limitation). In such embodiments, a driver signal may be applied to activated word lines and sense and amplify circuitry (e.g., sense and amplify circuit 618 and sense and amplify circuit 704, without limitation) are configured to observe an amount of snap-back current at bit line BL 0. Generally, an amount of snap-back current may be translated to a voltage (e.g., by a current to voltage converter, without limitation) and the voltage sensed to determine a number of devices that snapped back (i.e., a number of memory cells including a bit having a bit value of "1"), and hence perform a computational result.

In the aforementioned example embodiments, accessing and reading of bits may be performed destructively or non-destructively, and no particular type of reading (i.e., destructive or non-destructive) is implied nor should it be understood to be necessarily required to perform described embodiments or the legal equivalents thereof.

For capacitive cross-point memories (e.g., dynamic random access memory (DRAM) and hybrid random access memory (HRAM), without limitation), technique as for resistive memories described above may be applied with minor changes to accommodate capacitors and charge sharing instead of resistors. In some cases, capacitive cross-point memory may be destructive, although it is specifically contemplated that circuitry may be included in a cross-point memory to preserve data bits after a read.

Figure 8:
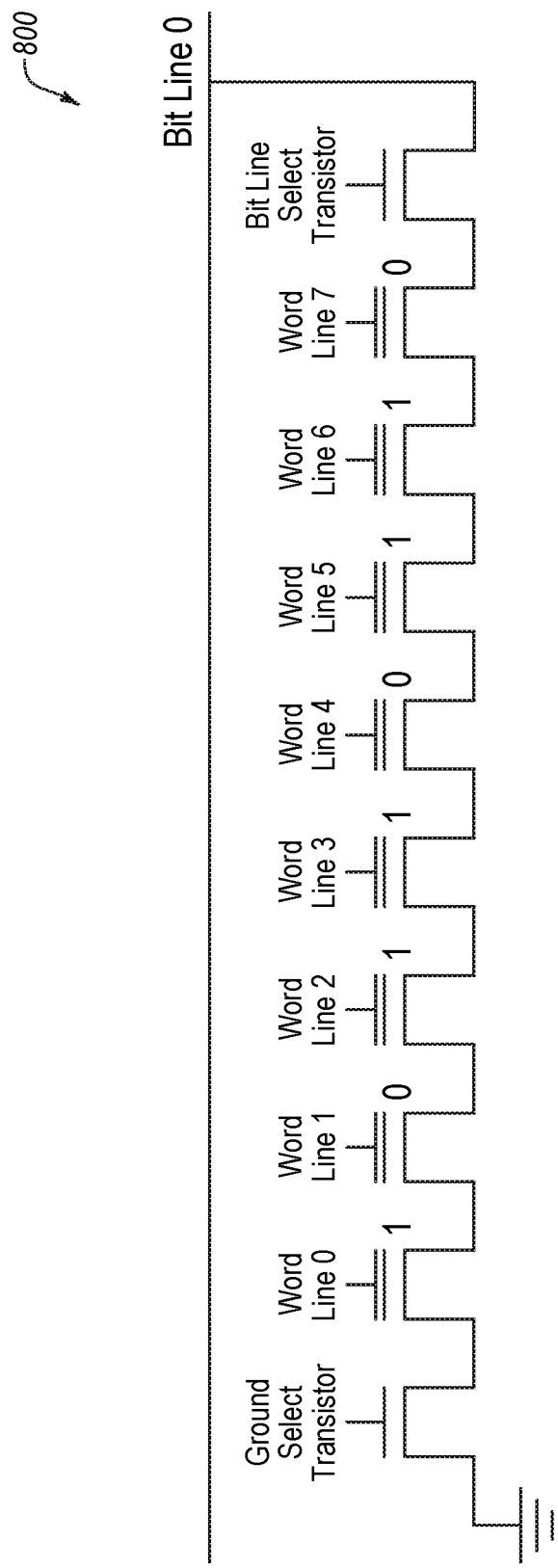
FIG. 8 shows a circuit diagram of a circuit representative of a NAND string type memory, in accordance with one or more embodiments.
Figure 9:
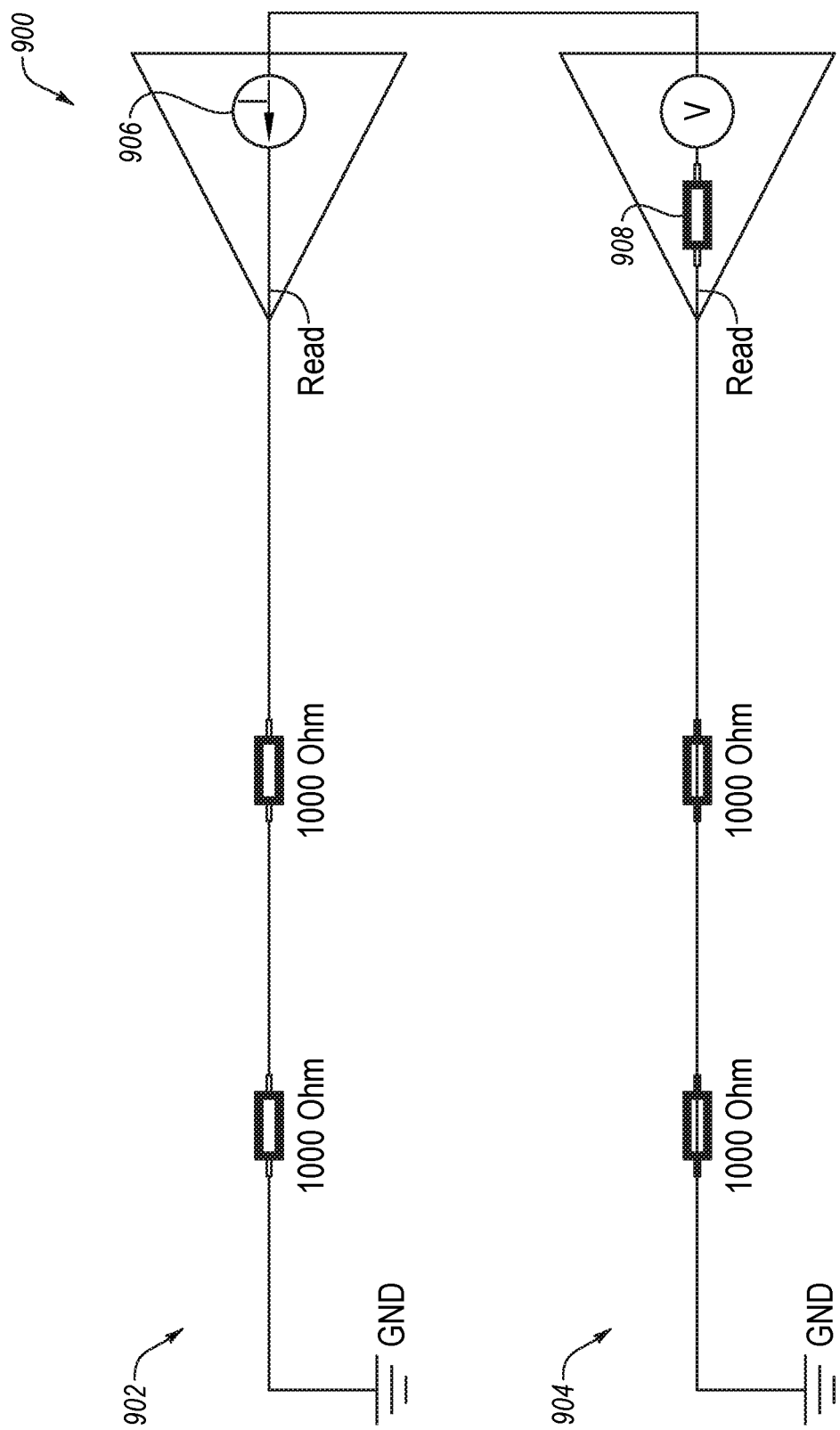
FIG. 9 shows circuit diagrams for sensing circuits used to perform spatiotemporal FMA in accordance with one or more embodiments.

FIG. 8 and FIG. 9 show circuit diagrams of circuits used for translating one or more state information about accessed bits of a data line to partial results and a computational result in a case where a memory includes a NAND string type memory, e.g., NAND Flash memory including 3D Flash NAND.

As used herein, "NAND string" means two or more NAND cells wherein a source of a NAND cell is connected to a drain of a next NAND cell.

In one or more embodiments, thermometric to binary decoding may be used to translate state information to results. NAND string 800 represents a typical NAND string known to the inventors of this disclosure, and includes serially connected transistors with dual gates: a floating gate for recording bits and a control gate for bypassing data recorded at a specific NAND cell.

At NAND string 800, bits can be recorded by placing a certain amount of charge inside a floating gate of transistors. Transistor conductance is controllable by this charge. For example, a bit 1 could correspond to low conducting state (also characterizable as a high resistance state). Bypassing of a NAND cell may be performed by temporarily applying a specific bias to a $2^{nd}$ gate (i.e., the control gate) connected to a WL, which "over-writes" the impact of floating gate by reducing the resistance across a cell to its minimum (effectively making transistors conducting in pass transistor state).

In one embodiment, all transistors are held in a bypass mode of operation and then bypass mode is selectively turned off for specific transistors of interest. More specifically, bypass mode is selectively turned off to activate selected bits for spatiotemporal FMA. Using a partial computation that includes accessing word line 0 and word line 2 of FIG. 8, in the first case described above WL0 and WL2 stay inactive and all other word lines are placed into bypass. In the other case described above, all word lines are initially in a bypass mode of operation and then bypass mode for WL0 and WL3 is selectively turned off.

In either case, assume high resistance state (i.e., bit 1) is encoded as 1000 Ohm and low resistance state (i.e., bit 0) corresponds to 10 Ohm and is equal to bypass mode, hence it can be ignored (relative to 1000 Ohm). So, NAND string 800 may be represented as access circuits including two serially connected resistors, as shown in FIG. 9.

FIG. 9 shows circuit diagrams for sensing circuits 900, which are two example embodiments of sensing circuits (here, sensing circuit 902 and sensing circuit 904) that may be used to access/read a sensing voltage (e.g., a bit value, without limitation) from NAND string 800.

In a contemplated use of sensing circuit 902, a current source 906 (e.g., 1 mA, without limitation) and the sensing voltage may be read at a location after the current source 906 as $V=I\times R=0.001\times(1000+1000)=2V$.

In a contemplated use of sensing circuit 904, a voltage source (e.g., 1V) is applied and a voltage read at a location after reference resistor 908 (Rref=1000 Ohm) as $V=Vref\times R=1\times(1000+1000)/(1000+1000+1000)=2/3$ V.

As a non-limiting example, in a case where only one of the cells had value of 1, a bit line resistance may be determined to be R=1000 Ohm, and output voltage would be: 1V (in the case of sensing circuit 902), and ½ V (in the case of 904).

As another non-limiting example, in a case where all cells are 0 (stated another way, no cells are a "1"), then a bit line resistance may be determined to be near 0 Ohm, and an output voltage would be near 0 V for both sensing circuit 902 and sensing circuit 904.

A sense amplifier may use an observed output voltage in the case of sensing circuit 902 and sensing circuit 904 to look up (internally) a result and a carry.

One or more embodiments of the disclosure relate, generally, to translating sensed voltages to result and carry-over. In some embodiments, sense amplifiers for multi-level cell NAND flash memory (e.g., triple-level cell (TLC) NAND flash memory and quad-level-cell (QLC) NAND flash memory, without limitation) may be configured to include circuitry for looking-up a result and carry-over in response to a sensed voltage.

Figure 10:
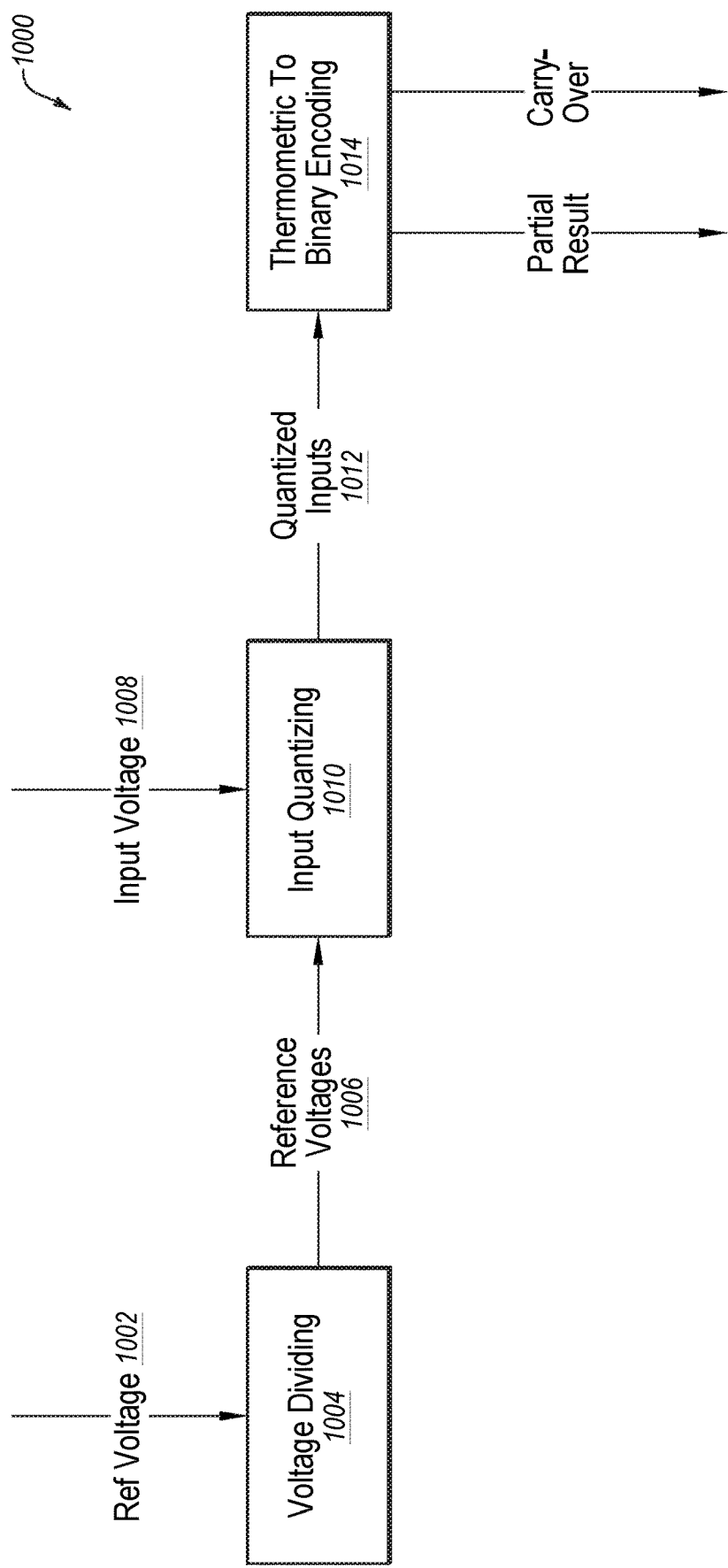
FIG. 10 shows a functional block diagram of an integrated ADC that may be included in a sense amplifier for performing spatiotemporal FMA, in accordance with one or more embodiments.

In some embodiments, a sense amplifier may include an integrated analog-to-digital converter (ADC). FIG. 10 shows a functional block diagram of an integrated ADC 1000 that may be included, in a sense amplifier such as sense amplifier 404, without limitation. In one or more embodiments, integrated ADC 1000 may include voltage dividing 1004, input quantizing 1010, and thermometric to binary encoding 1014.

In one or more embodiments, voltage dividing 1004 may be configured, generally, to perform one or more voltage divisions of ref voltage 1002. Voltage dividing 1004 may include one or more of any suitable electronic circuit/device for performing voltage dividing in accordance with disclosed embodiments, including, as a non-limiting example, as a resistive string including one or more resistive elements (e.g., resistors, transistors, and diodes, without limitation) in series. In one embodiment, a resistive string of voltage dividing 1004 may be a part of bit line continuation, and isolated from a data bit line.

In one or more embodiments, input quantizing 1010 may be configured, generally, to perform one or more input quantizations of item input voltage 1008 in response to reference voltages 1006. Input quantizing 1010 may include one or more of any suitable electronic circuit/device for performing input quantization in accordance with disclosed embodiments, including, as a non-limiting example, one or more voltage comparators (e.g., one or more Schmidt triggers, without limitation).

In one or more embodiments, thermometric to binary encoding 1014 may be configured, generally, to provide result and carry-over in response to quantized inputs 1012. Thermometric to binary encoding 1014 may include one or more electronic circuits/devices for performing thermometric to binary encoding in accordance with disclosed embodiments, including, as a non-limiting example, gate arrays, look-up-tables (LUTS), and combinations thereof.

In a contemplated operation of integrated ADC 1000, when input voltage 1008 is asserted at an input of integrated ADC 1000 (not shown) respective input quantizers of input quantizing 1010 trigger in response to a comparison of input voltage 1008 to respective reference voltages 1006 provided by respective voltage dividers of voltage dividing 1004. Thermometric to binary encoding 1014 providers result and carry bits in response to quantized inputs 1012. Result and carry bits may be stored as partial computational results used (e.g., by bit quantifier 210 of FIG. 2, without limitation) to generate complete computational results (e.g., partial results 212 of FIG. 2, without limitation).

In one or more embodiments, circuitry for thermometric to binary encoding 1014 (e.g., error correction circuitry and encoder circuitry, without limitation) may be routed under, over, around or through a memory array. In one embodiment, such circuitry may be routed under a memory array, e.g., to protect memory capacity from otherwise being degraded by another routing arrangement, without limitation.

Figure 11:
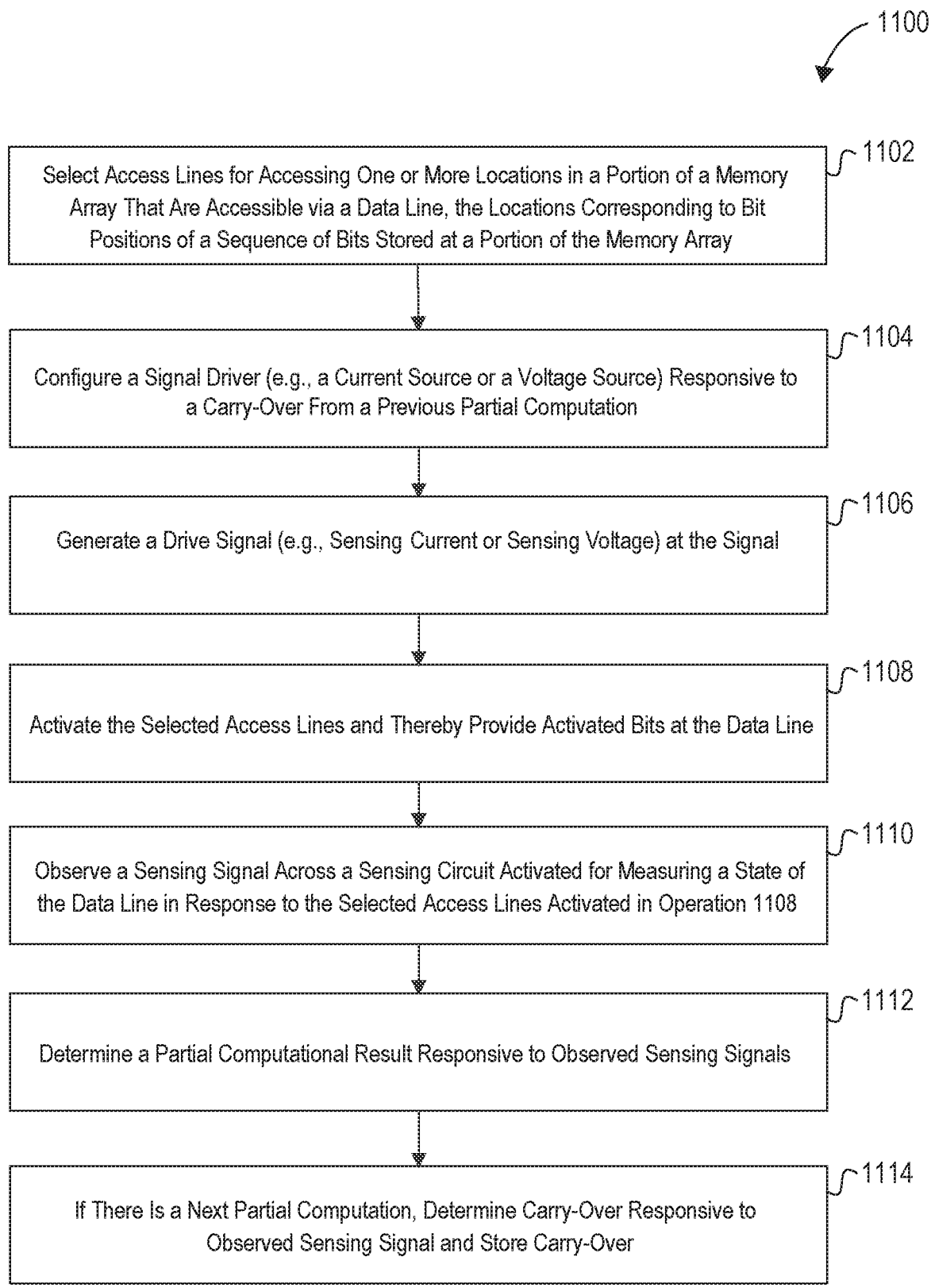
FIG. 11 shows a process for performing spatiotemporal FMA, in accordance with one or more embodiments.

FIG. 11 shows a flowchart of an embodiment of a process 1100 for performing spatiotemporal FMA.

In operation 1102, process 1100 selects for access one or more locations in a portion of a memory array along a data line, bits stored at the locations in the portion of the memory array accessible via the data line. Respective locations of the one or more locations may correspond to one or more bit positions for one or more bits of an operand stored along the data line. In one or more embodiments, bits of an operator may be used to direct the selection of bit positions that are included in the one or more bit positions.

In embodiments including in-memory processing at a cross-point memories, respective first access lines may cross, at a perpendicular, the data line at specific locations associated with bit positions of the first bit positions. In embodiments including in-memory processing at NAND string memories, respective first access lines may include or be operatively coupled to gates of NAND cells.

In operation 1104, process 1100 configures a signal driver responsive to a carry-over from a previous partial computation. Operation 1104 may be skipped if there was no previous partial computation. In one embodiment, configuring a signal driver may include configuring a current source to provide a current at a specified level. In another embodiment, configuring a signal driver may include configuring a voltage source to provide a voltage at a specified level.

In operation 1106, process 1100 generates a driver signal (e.g., a sensing current or a sensing voltage, without limitation) at the signal driver configured in operation 1104. In one or more embodiments, the driver signal may be provided to a sensing circuit configured to generate sensing signals that are indicative of a state of an activate data line, and, more specifically, a quantity of bits having bit value="1" at activated data line.

In operation 1108, process 1100 activates access lines selected in operation 1102, and thereby provides activated bits at the data line. Activating the access lines may include substantially simultaneously activating two or more access lines associated with two or more of the locations in the portion of the memory array, and more specifically, two or more bit positions that correspond to the two or more locations.

In operation 1110, process 1100 observes a sensing signal across a sensing circuit, that is, the sensing circuit that received the driver signal in operation 1106. As described herein, in one or more embodiments the sensing signal is indicative of a quantity of activated bits on the data line. In one or more embodiments, the sensing circuit may have been temporarily activated for measuring a state (or a signal indicative of a state) of the selected access lines activated in operation 1108.

In operation 1112, process 1100 determines a partial result responsive to the observed sensing signal and stores the partial result.

If there is a next partial computation, then in operation 1112, process 1100 determines a carry-over responsive to the observed sensing signal and stores the carry-over. The stored carry-over is then available for configuring the signal driver in a subsequent partial computation.

In some embodiments, a subset of the access lines corresponding to selected bit positions may be simultaneously activated instead of access lines for all selected bit positions, as a non-limiting example, due to hardware limitations. So, in some embodiments, performing a partial computation and obtaining a partial result may involve performing a number of intermediate partial computations and obtaining a number of intermediate partial results.

Figure 12:
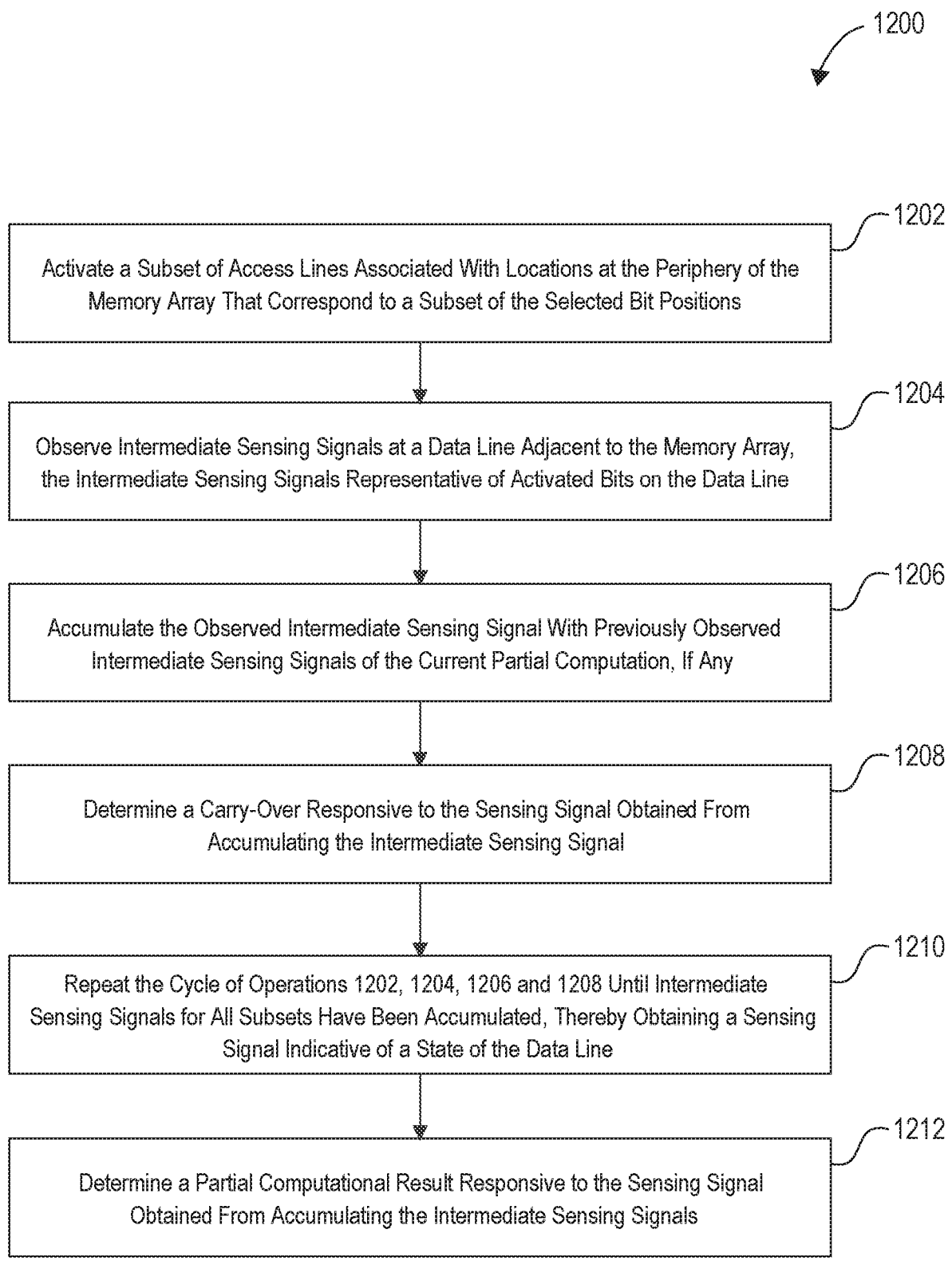
FIG. 12 shows a process for performing spatiotemporal FMA, in accordance with one or more embodiments.

FIG. 12 shows a flow chart for an embodiment of a process 1200 for performing a partial computation that includes performing a number of intermediate partial computations. As a non-limiting example, process 1200 may be performed in place of operation 1108, operation 1110, operation 1112 and operation 1114 of process 1100.

In operation 1202, process 1200 activates a subset of access lines associated with locations in a portion of a memory array, such locations corresponding to a subset of bit positions of selected bit positions.

In operation 1204, process 1200 observes intermediate sensing signals at a data line of the memory array. The intermediate sensing signals may be representative of activated bits on the data line. The activated bits may correspond bits stored at the locations of the memory array associated with the access lines activated in operation 1202, and more specifically, to bits at selected bit positions of a bit sequence.

In operation 1206, process 1200 accumulates the observed intermediate sensing signal with previously observed intermediate sensing signals of a current partial computation, if any.

In operation 1208, process 1200 determines a carry over in response to the sensing signal obtained from accumulating the intermediate sensing signal in operation 1206.

In operation 1210, process 1200 repeats the sub-process of operation 1202, operation 1204, and operation 1206 until intermediate sensing signals for all subsets of access lines have been accumulated. Stated another way, the sub-process is repeated until intermediate sensing signals corresponding to access lines for all locations/selected bit positions of a partial computation have been accumulated. A sensing signal is obtained that is substantially the sum of the accumulated intermediate sensing signals.

In operation 1212, process 1200 determines a partial computational result responsive to the sensing signal obtained from accumulating the intermediate sensing signals.

One or more embodiments described herein include a method. The method may include selecting for access first bit positions of first bits of an operand stored at a first location in along a data line in a memory array. The method also includes activating first access lines associated with the selected first bit positions. The method also includes accessing the first bits of the operand that are stored at the selected first bit positions. The method also includes receiving at least a portion of a computational result responsive to the accessed first bits.

One or more embodiments described herein include a system. The system may include access lines, a data line, a bit quantifier, and a computational unit. The bit quantifier may be operatively coupled to the data line. The bit quantifier may be configured to determine one or more states of the data line. The computational unit may be configured to provide a computational result responsive to the one or more states of the data line.

One or more embodiments described herein include a circuit. The circuit may include a first line, a number of second lines, and a measurement circuit. The number of second lines configured to couple to the first line via memory elements located along the first line. Respective lines of the number of second lines each may include an activation element configured to alternately couple and de-couple the line to a specified voltage level (e.g., ground or a supply voltage, without limitation). In one embodiment, a line of the number of second lines may include a resistive element. The circuit may also include a circuit that is arranged to measure a voltage across a parallel resistive network activated by operatively coupling the line to a reference node.

Additional embodiments of the present disclosure include an electronic system. The electronic system may include at least one input device, at least one output device, and at least one processor device operably coupled to the input device and the output device. The electronic system may also include at least one memory device operably coupled to the at least one processor device and including one or more memory cell arrays and one or more fuse-multiply-add (FMA) units coupled to respective memory cell arrays. A FMA unit may be configured to select for access a first bit positions of a first bits of an operand stored at a data line. The FMA unit may be further configured to activate first access lines responsive to the selected first bit positions. The FMA unit may be further configured to access the first bits of the operand stored at the selected first bit positions responsive to the first activated access lines. The FMA unit may be further configured to obtain a computational result responsive to the accessed first bits.

In accordance with common practice, the various features illustrated in the drawings may not be drawn to scale. The illustrations presented in the present disclosure are not meant to be actual views of any particular apparatus (e.g., a device or system, without limitation) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device, without limitation) or all operations of a particular method.

As used herein, the term "device" or "memory device" may include a device with memory, but is not limited to a device with only memory. For example, a device or a memory device may include memory, a processor, and/or other components or functions. For example, a device or memory device may include a system on a chip (SOC). In some embodiments, the computation methods described herein may be applicable to storage device, such as solid-state drives. Therefore, the term "memory device" used herein may include a storage device.

Terms used herein and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A method, comprising:
    selecting for access first bit positions of first bits of a first operand stored in a first portion of a memory array, the first bits accessible via a first data line;
    activating first access lines associated with the selected first bit positions;
    accessing the first bits of the first operand; and
    receiving at least a portion of a first computational result responsive to the accessed first bits and based, at least in part, on a truth table.

2. The method of claim 1, further comprising:
    selecting a first bit position of the first bit positions of the first operand responsive to a value of a bit at a first bit position of an operator; and
    selecting a second bit position of the first bit positions of the first operand responsive to a value of a bit at a second bit position of the operator.

3. The method of claim 1, further comprising:
    generating a partial computational result based at least in part on a number of accessed first bits that have a specified bit value.

4. The method of claim 3, wherein the generating the partial computational result comprises:
    generating a summation result and a carry-over.

5. The method of claim 1, further comprising:
    selecting for access second bit positions of second bits of the first operand;
    activating second access lines associated with the selected second bit positions; and
    accessing the second bits of the first operand responsive to the activated second access lines.

6. The method of claim 5, further comprising:
    receiving a first partial computational result responsive to the accessed second bits;
    receiving a second partial computational result responsive to the accessed second bits; and
    combining the first partial computational result and the second partial computational result.

7. The method of claim 1, further comprising: accessing the first data line at the first bit positions using one or more of the first data line, memory elements, the first access lines, or any combination or subcombination thereof.

8. The method of claim 1, further comprising: accessing the first data line at respective first bit positions using a parallel resistive network comprising the first data line, memory elements, and the first access lines.

9. The method of claim 7, wherein the accessing the first data line comprises:
    placing a first number of serially coupled memory elements into a low impedance mode; and
    while a second number of the serially coupled memory elements are in a default impedance mode:
        accessing the second number of the serially coupled memory elements; and
        determining the second number of the accessed serially coupled memory elements that have a specified bit value.

10. The method of claim 1, further comprising:
    coupling the first access lines to a specified level;
    providing a driver signal to the first data line; and
    sensing a signal at the first data line.

11. The method of claim 1, further comprising:
    accessing groups of bits of the first data line;
    receiving intermediate partial computations responsive to states of the accessed groups of bits of the first data line; and
    combining the intermediate partial computations to obtain a partial computational result.

12. The method of claim 1, further comprising:
    outputting bits that are common to all sequences of operators;
    allocating unique operators with operands; and
    activating an access line responsive to determining that an operator bit is a logic high.

13. A system comprising:
  access lines;
  a data line coupled to the access lines and configured to exhibit states responsive to respective activated access lines;
  a bit quantifier coupled to the data line, wherein the bit quantifier is configured to determine a current state of the data line based, at least in part, on a truth table; and
  a computational unit, the computational unit comprising circuitry configured to provide a computational result responsive to the current state of the data line determined by the bit quantifier.

14. The system of claim 13, further comprising a bit aligner, the bit aligner comprising circuitry configured to activate one or more of the access lines.

15. The system of claim 14, wherein the access lines are configured to be activated by operative coupling to a specified level.

16. The system of claim 13, wherein the computational unit is configured to asynchronously provide a partial computational result corresponding to a state of the data line.

17. The system of claim 13, wherein the bit quantifier comprises:
  a voltage divider;
  an input quantizer; and
  an encoder.

18. The system of claim 13, wherein a number of serially coupled memory elements form the data line and the access lines.

19. The system of claim 13, wherein the computational unit is configured to:
  obtain partial computational results corresponding to respective states of the data line; and
  combine the partial computational results to obtain the computational result.

20. The system of claim 13, further comprising a memory, wherein the computational unit is configured to:
  store intermediate partial computations at the memory; and
  obtain a partial computation based, at least in part, on an intermediate partial computation stored at the memory.

21. A circuit, comprising:
  a first line;
  a number of second lines configured to couple to the first line, wherein each respective lines of the number of second lines configured to couple to the first line via a memory element and comprise an activation element configured to alternately couple and de-couple the first line to a specified voltage level; and
  a circuitry coupled to terminals that are arranged to enable the circuitry to measure a voltage across a parallel network activated by operative coupling the first line to a reference node,
  wherein the measured voltage corresponds to a summation result and a carry-over.

22. The circuit of claim 21, wherein the reference node is arranged relative to the parallel network such that during a voltage measurement, the reference node acts like a voltage divider.

* * * * *